US012602795B2

(12) United States Patent
Polak et al.

(10) Patent No.: US 12,602,795 B2
(45) Date of Patent: Apr. 14, 2026

(54) FALSE POSITIVE REDUCTION OF LOCATION SPECIFIC EVENT CLASSIFICATION

(71) Applicant: Viisights Solutions Ltd., Tel-Aviv (IL)

(72) Inventors: Simon Polak, Givat Shmuel (IL); Shiri Gordon, Tel Aviv (IL); Menashe Rothschild, Tel Aviv (IL); Asaf Birenzvieg, Hod-HaSharon (IL)

(73) Assignee: Viisights Solutions Ltd., Tel-Aviv (IL)

( * ) Notice: Subject to any disclaimer, the term of this patent is extended or adjusted under 35 U.S.C. 154(b) by 400 days.

(21) Appl. No.: 18/372,774

(22) Filed: Sep. 26, 2023

(65) Prior Publication Data

US 2025/0104253 A1     Mar. 27, 2025

(51) Int. Cl.
*G06T 7/246* (2017.01)

(52) U.S. Cl.
CPC .... *G06T 7/246* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2021/0158048 A1* | 5/2021 | Lee | G06F 18/22 |
| 2022/0392225 A1* | 12/2022 | Jakobsen | G06V 20/52 |
| 2023/0112298 A1* | 4/2023 | Sundararajan | G06N 3/084 |
| | | | 382/159 |

* cited by examiner

*Primary Examiner* — Leon Viet Q Nguyen

(57) ABSTRACT

A method of training site-specific filter classifiers, comprising receiving a plurality of on-site feature vectors created by one or more classifiers deployed in a certain site to classify one or more predefined anomaly events based on imagery data captured in the certain site, the classifier(s) is trained using a plurality of non-site-specific samples, selecting a plurality of false positive feature vectors from a subset of the plurality of on-site feature vectors having a score exceeding a certain threshold, receiving a plurality of true positive feature vectors extracted from positive samples reflecting the predefined anomaly event(s),training one or more site-specific filter classifiers using the false positive feature vectors and the true positive feature vectors, and providing the trained site-specific filter classifiers for filtering out one or more false positive detections of the anomaly event(s) detected in the certain site by the classifier(s).

18 Claims, 10 Drawing Sheets

600

602 — RECEIVE ON-SITE SAMPLE(s)

604 — APPLY TRAINED CLASSIFIER(s) TO CLASSIFY EACH SAMPLE

606 — SAMPLE CLASSIFIED AS POSITIVE?

YES

NO

610 — APPLY TRAINED SITE-SPECIFIC FILTER CLASSIFIER(s) TO CLASSIFY THE SAMPLE

608 — DETERMINE SAMPLE IS NEGATIVE

612 — SAMPLE CLASSIFIED AS POSITIVE?

NO

YES

616 — OUTPUT DETECTION INDICATION

614 — FILTER OUT THE SAMPLE

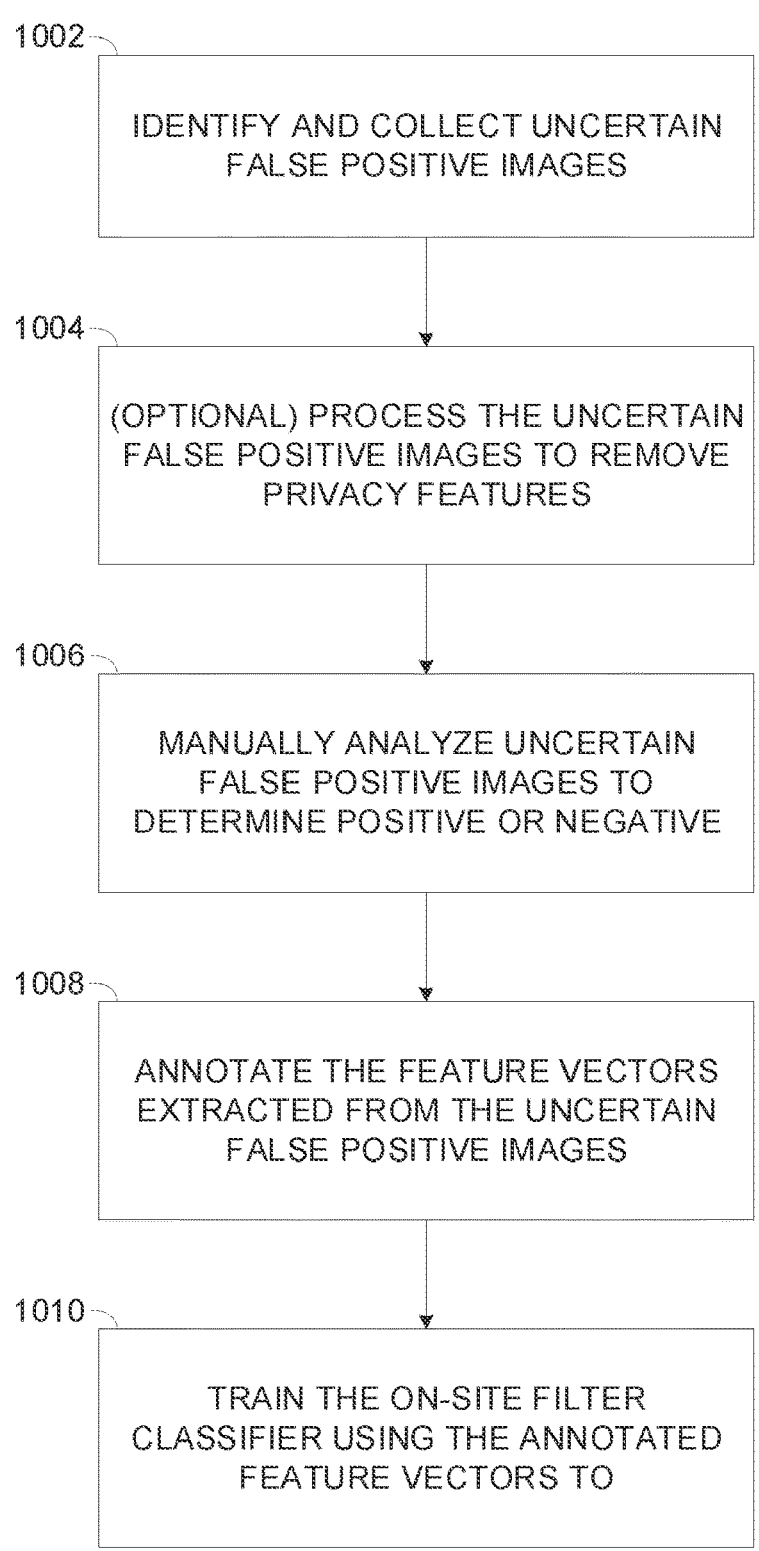

1002

IDENTIFY AND COLLECT UNCERTAIN
FALSE POSITIVE IMAGES

1004

(OPTIONAL) PROCESS THE UNCERTAIN
FALSE POSITIVE IMAGES TO REMOVE
PRIVACY FEATURES

1006

MANUALLY ANALYZE UNCERTAIN
FALSE POSITIVE IMAGES TO
DETERMINE POSITIVE OR NEGATIVE

1008

ANNOTATE THE FEATURE VECTORS
EXTRACTED FROM THE UNCERTAIN
FALSE POSITIVE IMAGES

1010

TRAIN THE ON-SITE FILTER
CLASSIFIER USING THE ANNOTATED
FEATURE VECTORS TO

FIG. 10

FALSE POSITIVE REDUCTION OF LOCATION SPECIFIC EVENT CLASSIFICATION

BACKGROUND

The present invention, in some embodiments thereof, relates to detecting anomaly events based on imagery data classification, and, more specifically, but not exclusively, to applying site-specific (location specific) filtering to reduce false positive detection of anomaly events detected based on imagery data classification.

Anomaly detection, specifically detecting visual anomalies in imagery data such, for example, images, video streams, imaging maps (e.g., heat maps, edge images, etc.) is a key element in a plurality of applications ranging from public order and safety, through security systems, to emergency response services and military uses.

Traditionally anomaly detection involved major manual and human effort by operators, users, and/or the like which had to visually monitor and inspect imagery feeds depositing monitored sites. Such human based methods and systems are obviously highly inefficient, extremely costly and significantly unsalable.

Major resources are therefore invested in developing high performance, efficient and scalable automated anomaly detection systems which may effectively process live imagery feeds captured by multiple image sensors in order to detect anomaly events taking place in the monitored sites.

The evolution leaps of Artificial Intelligence (AI) and machine learning (ML) made in recent years paved the way for unprecedented automated anomaly detection capabilities and performance.

SUMMARY

According to a first aspect of the present invention there is provided a method of training site-specific filter classifiers, comprising using one or more processors for:

Receiving a plurality of on-site feature vectors created by one or more classifiers deployed in a certain site to classify one or more predefined anomaly events based on imagery data captured in the certain site. The one or more classifiers are trained using a plurality of non-site-specific samples.

Selecting a plurality of false positive feature vectors from a subset of the plurality of on-site feature vectors having a score exceeding a certain threshold.

Receiving a plurality of true positive feature vectors extracted from positive samples reflecting the one or more predefined anomaly events.

Training one or more site-specific filter classifiers using the plurality of false positive feature vectors and the plurality of true positive feature vectors.

Providing the one or more site-specific filter classifiers for filtering out one or more false positive detections of the one or more anomaly events detected in the certain site by the one or more classifiers.

According to a second aspect of the present invention there is provided a system for training an on-site filter classifier, comprising one or more processors configured to execute a code. The code comprising:

Code instructors to receive a plurality of on-site feature vectors created by one or more classifiers deployed in a certain site to classify one or more predefined anomaly events based on imagery data captured in the certain site. The one or more classifiers are trained using a plurality of non-site-specific samples.

Code instructors to select a plurality of false positive feature vectors extracted from a subset of the plurality of on-site feature vectors having a score exceeding a certain threshold.

Code instructors to receive a plurality of true positive feature vectors extracted from positive samples reflecting the one or more predefined anomaly events.

Code instructors to train one or more site-specific filter classifiers using the plurality of false positive feature vectors and the plurality of true positive feature vectors.

Code instructors to provide the one or more site-specific filter classifiers for filtering out one or more false positive detections of the one or more anomaly events detected in the certain site by the one or more classifiers.

According to a third aspect of the present invention there is provided a method of reducing false positive classification events using site-specific filter classifiers, comprising using one or more processors for:

Receiving one or more on-site samples classified as positive by one or more classifiers deployed in a certain site to detect one or more predefined anomaly events based on imagery data depicting at least part of the certain site.

Applying one or more site-specific filter classifiers to compute a filter classification score for an on-site feature vector extracted from the one or more on-site samples, Estimating whether each of the one or more on-site samples is true positive or false positive based on comparison of the filter classification score to a filter threshold;

Filtering out the one or more on-site samples in case their filter classification scores do not exceed the filter threshold.

Outputting one or more detection indications in case the filter classification score exceeds the filter threshold indicative of detection of the one or more predefined anomaly events.

Wherein the one or more classifiers are trained using a plurality of non-site-specific samples. Wherein the one or more site-specific filter classifiers are trained using a plurality of false positive feature vectors and a plurality of true positive feature vectors. The plurality of false positive feature vectors are extracted from a subset of a plurality of on-site samples having a score, computed by the one or more classifier, exceeding a certain threshold. The plurality of true positive feature vectors extracted from a subset of the plurality of non-site-specific samples reflecting the one or more predefined anomaly events.

In a further implementation form of the first, second and/or third aspects:

Each of the plurality of on-site feature vectors comprises a plurality of features extracted from a corresponding one of a plurality of on-site image samples captured by one or more image sensors deployed to monitor at least part of the certain site.

Each of the plurality of true positive feature vectors comprises a plurality of features extracted from a respective one of the plurality of non-site-specific samples.

In a further implementation form of the first, second and/or third aspects, one or more of the site-specific filter classifiers are integrated in the one or more classifiers.

In a further implementation form of the first, second and/or third aspects, one or more of the site-specific filter classifiers are independent of the one or more classifiers.

In a further implementation form of the first, second and/or third aspects, the one or more site-specific filter classifiers comprise a plurality of site-specific filter classifiers each trained to filter out false positive detection of the one or more predefined anomaly events under different environmental conditions.

In a further implementation form of the first, second and/or third aspects, a number of the plurality of false positive feature vectors exceeds a predefined number.

In a further implementation form of the first, second and/or third aspects, the plurality of false positive feature vectors are extracted from a plurality of on-site samples captured during a time period exceeding a predefined time period.

In a further implementation form of the first, second and/or third aspects, the training comprises:

Using a training subset to train the one or more site-specific filter classifiers. The training subset comprises a first group of false positive feature vectors selected from the plurality of false positive feature vectors and a first group of true positive feature vectors selected from the plurality of true positive feature vectors, and Using a validation subset to set a filter threshold for the one or more site-specific filter classifiers such that each false positive feature vector having a filter classification score, computed by the one or more site-specific filter classifiers, which does not exceed the filter threshold is filtered out. The validation subset comprises a second group of false positive feature vectors selected from the plurality of false positive feature vectors and a second group of true positive feature vectors selected from the plurality of true positive feature vectors.

In a further implementation form of the first, second and/or third aspects, the training of the one or more site-specific filter classifiers employs supervised learning wherein the false positive feature vectors having an exceeding score are annotated automatically.

In an optional implementation form of the first, second and/or third aspects, one or more of the site-specific filter classifiers are further trained online, post deployment, without interfering with detection operation of the one or more classifiers.

In an optional implementation form of the first, second and/or third aspects, one or more of site-specific filter classifiers are trained in one or more additional training iterations, wherein in each iteration the one or more site-specific filter classifiers are further trained using a respective set of false positive feature vectors classified by the one or more classifiers as positive in a previous iteration.

In an optional implementation form of the first, second and/or third aspects, one or more uncertain on-site samples are identified to be classified as false positive while estimated to potentially be true positive, each of the one or more uncertain on-site samples are analyzed to determine whether it is true positive or false positive, the feature vector extracted from each of the one or more uncertain on-site samples is annotated as positive or negative according to the determination, and the annotated feature vector(s) are used for further training one or more site-of the specific filter classifiers.

In an optional implementation form of the first, second and/or third aspects, one or more image processing algorithms are applied to remove privacy features from the one or more uncertain on-site samples.

In a further implementation form of the first, second and/or third aspects, the one or more on-site samples are manually analyzed and annotated as positive or negative.

In an optional implementation form of the first, second and/or third aspects, the one or more classifiers are replaced by one or more updated classifiers. The one or more site-specific filter classifiers are trained (re-trained) using one or more on-site feature vector extracted from one or more stored on-site sample captured prior to the update and classified by the one or more updated classifiers.

In a further implementation form of the first, second and/or third aspects, the one or more site-specific filter classifiers comprise one or more machine learning models.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 11:
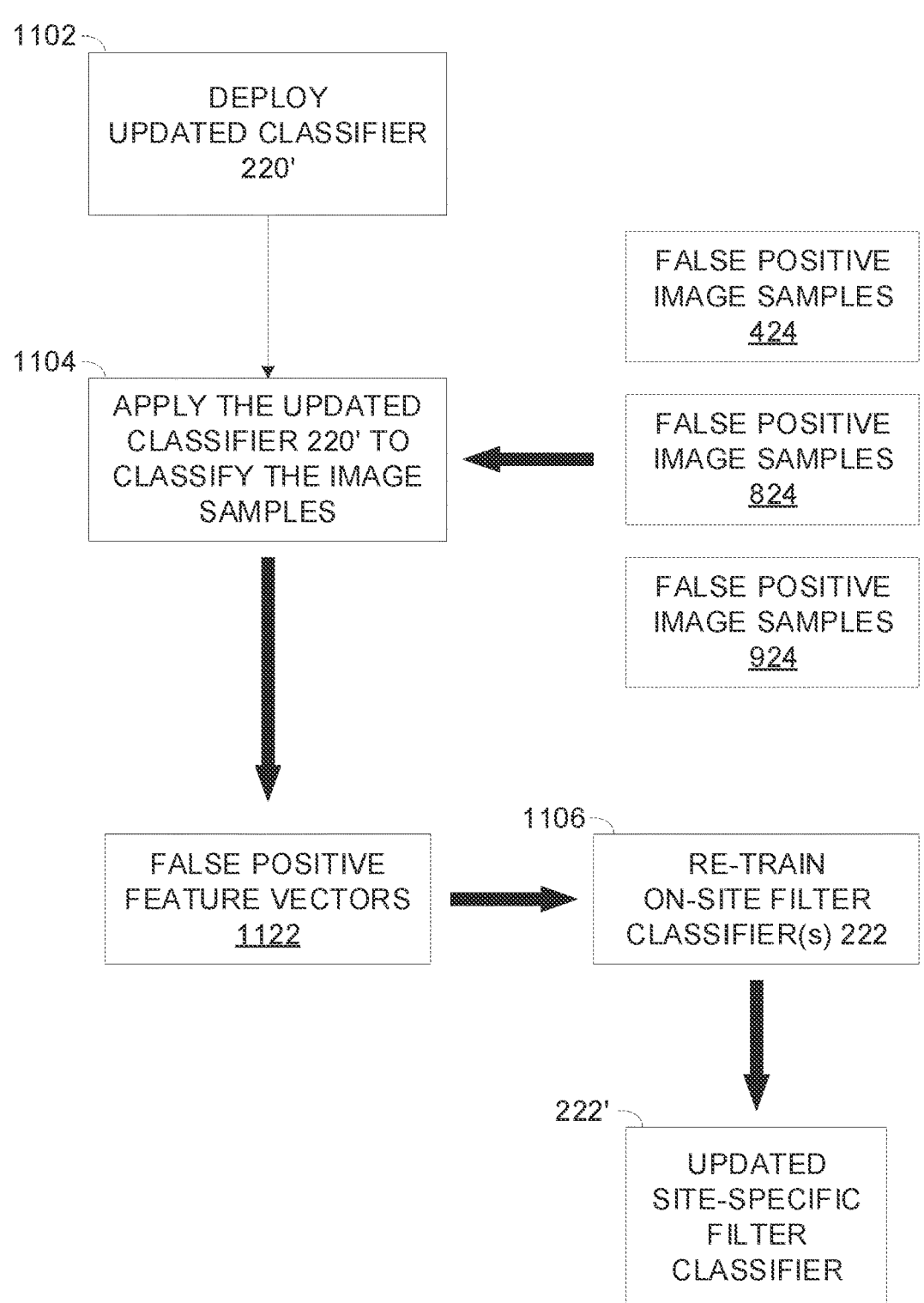

FIG. 10 is a flow chart of an exemplary process of analyzing and annotating uncertain false positive samples which are potentially positive samples, according to some embodiments of the present invention; and FIG. 11 is a schematic illustration of an exemplary sequence of re-training a site-specific filter classifier to filter out false positive classification of an updated classifier deployed to replace a previous classifier for classifying anomaly events detected in a certain site, according to some embodiments of the present invention.

DETAILED DESCRIPTION

The present invention, in some embodiments thereof, relates to detecting anomaly events based on imagery data classification, and, more specifically, but not exclusively, to applying site-specific (location specific) filtering to reduce false positive detection of anomaly events detected based on imagery data classification.

Detecting anomaly events, attributes, behavior and/or the like, collectively designated anomaly events herein after, for example, emergency events, violence events, public order violation events, nature anomaly events, and/or the like based on imagery data analysis is a basic building block in a plurality of applications ranging from security and safety monitoring, through public order maintenance to medical and military applications.

Machine Learning (ML) based classification which is rapidly evolving in recent years has proven to be highly efficient, robust and reliable in visual data analysis for detecting such anomaly events. As known in the art, such ML models (classifiers), for example, Neural Networks (NN), Deep Neural Networks (DNN), Support Vector Machines (SVM), and/or the like may be trained using a plurality of training samples, specifically image samples, for example, images, video frames, imaging maps, thermal maps, and/or the like.

The training samples may comprise positive samples depicting one or more targeted (predefined) anomaly events and negative samples which do not depict any of these anomaly events. The ML based classifiers may be trained using the training samples (labeled or not) in one or more supervised, unsupervised, and/or semi-supervised training session such that the classifiers may evolve, adapt and learn to detect the predefined anomaly events.

However, such classifier(s) are typically trained using training samples relating to the target anomaly events captured, collected, simulated, and/or otherwise obtained in multiple sites meaning these classifiers are general in the sense that they are not specifically adapted and/or customized for any specific site (location, rea) but are rather trained to classify and detect the predefined anomalies regardless of the site in which these anomalies are detected and logged (captured).

This may present major challenges to efficiently analyze visual data captured in specific sites and in order to detect the anomaly events since the imagery data captured in different sites may be affected and/or subject to attributes, in particular visual attributes, which are specific to each site and may change from site to site.

Such visual attributes that may affect the visual data (e.g., images, frames, imaging maps, thermal maps, etc.) captured in a certain site may relate, for example, to the site itself, for example, background elements and/or objects, lighting and/or illumination conditions, dynamic patterns (e.g., vehicles, people, animals, vegetation, dynamic mechanisms, etc.) typical to the site, and/or the like. In another example, the visual attributes specific to a certain site may relate to one or more image sensors (e.g., camera, video camera, thermal imaging sensor, Infrared sensor, night vision sensor, etc.) which capture the visual data depicting the site and/or part thereof, for example, a view angle, blocking elements, sensor parameters (e.g., resolution, field of view, dynamic range, etc.), and/or the like.

Due to their general and non-site-specific nature, the performance of such classifiers deployed in specific sites may degrade as result of the effects attributed to visual attributes specific to each site. This degradation in the classifiers' performance may be expressed by one or more measures and/or metrics known in the art. For example, these general classifier(s) may yield increased false positive classifications (detections) of one or more of the anomaly events meaning that the classifier(s) incorrectly detect (classify) one or more of the anomaly events while, in reality it did not occur.

This limitation may be further enhanced in applications, scenarios and/or environments in which failing to detect anomaly events which occurred (false negative detection) is highly undesirable and possibly unacceptable due to risk, danger, and/or harm, since classifier(s) deployed for such applications may be configured to apply a lower bounds (threshold) to avoid false negatives which by definition may increase false positive classification.

According to some embodiments of the present invention, there are provided methods, systems, devices and computer software programs for filtering out false positive detections of the predefined anomaly events classified by one or more general classifiers deployed in a certain site in order to increase performance of the anomaly events classification and detection, for example, accuracy, reliability, consistency, robustness, and/or the like.

In particular, one or more site-specific (location specific) filter classifiers may be deployed to filter out false positive detections of the anomaly events by the general classifiers. The site-specific filter classifier(s) may be trained to further analyze positive classifications of the anomaly event(s) estimated by the general (non-site-specific) classifier(s) and filter out detections which are estimated to be false positive, i.e., negative detections which the classifier(s) incorrectly classifies as positive detection of one or more of the anomaly events.

The site-specific filter classifier(s) adapted for specific sites may be significantly more light-weight compared to the general classifier(s) since while the general classifier(s) may typically comprise both feature extraction functionality and classification functionality, the site-specific filter classifier(s) may implement only classification functionality which is significantly less computing intensive compared to feature extraction. This is because feature extraction comprises processing each received image sample to extract a plurality of image (visual) features and create a corresponding feature vector which may consume significant computing resources, for example, processing resources, processing time, storage resources, and/or the like. Classification of the extracted feature vectors on the other hand may be significantly less resource consuming.

A site-specific filter classifier deployed in a certain site may be trained using a plurality of feature vectors extracted from a plurality of training image samples, in particular on-site image samples captured at the certain site thus adapting it per the specific site.

Specifically, the on-site image samples captured at the certain site may be processed by one or more general classifiers to produce corresponding on-site feature vectors. These on-site feature vectors assumed to be negative since it is unlikely that the predefined anomaly event(s) will take place (occur) at the specific site during the training phase of site-specific filter classifier(s) and it is therefore assumed that none of the on-site samples reflects (depicts) the predefined anomaly event(s).

Each site-specific filter classifier may be further trained using a plurality of positive feature vectors extracted from positive image samples captured at one or more sites not necessarily related to the certain site for which the site-specific filter classifier is deployed and may be thus designated or considered non-site specific image samples. For example, one or more positive feature vectors may be extracted from one or more positive non-site specific image samples used to train the general classifier(s).

Each site-specific filter classifier trained with on-site image samples may therefore specifically adapt, adjust, and/or learn the visual attributes specific to the target site and may be capable of classifying each on-site sample, specifically its corresponding feature vector, with significantly improved performance compared to the general classifier(s).

One or more site-specific filter classifier(s) trained for a certain site may be then applied for filtering out false positive classifications made by one or more general (non-site-specific) classifiers deployed to detect the predefined anomaly event(s) in the certain site.

Optionally, a plurality of site-specific filter classifier(s) may be adapted and trained accordingly for filtering out false positive detections in each of one or more sites. For example, a first site-specific filter classifier may be adapted and trained to classify feature vectors extracted from on-site image samples captured in a certain site during day time under high illumination conditions while a second site-specific filter classifier may be adapted and trained to classify feature vectors extracted from on-site image samples captured in the certain site during night under low illumination conditions. In another example, a first site-specific filter classifier may be adapted and trained to classify and/or detect a first predefined anomaly event while a second site-specific filter classifier may be adapted and trained to classify and/or detect a second predefined anomaly event.

Optionally, one or more of site-specific filter classifiers deployed to support anomaly events detection in a one or more sites may be further trained online, post deployment and initial training while they are already operational. Moreover, the online training may not impact and/or interfere with their detection operation.

Moreover, one or more site-specific filter classifiers deployed to support anomaly events detection in a one or more sites may be trained online in one or more additional training iterations using one or more false positive on-site feature vectors classified by both the general classifier(s) and by the site-specific filter classifier(s) to be positive. Such feature vectors may be annotated (labeled) as negative and used to further train one or more of the site-specific filter classifier(s).

Optionally, the on-site image samples corresponding to the false positive on-site feature vectors may be annotated accordingly as negative and may be used to extract feature vectors with a new general classifier(s) deployed for the certain site and then train a new filter classifier(s) for this newly deployed general classifier(s).

Applying ML based site-specific filter classifiers to filter out false positive detections of general (non-site-specific) ML based classifiers may present major benefits and advantages compared to currently existing methods and systems for imagery data based anomaly events detection.

First, deploying site-specific filter classifier(s) to filter out false positive detections may significantly improve detection performance, for example, accuracy, reliability, consistency, robustness, and/or the like since site-specific filter classifier(s) are adapted and trained to learn their site specific visual attributes and compensate for classification effects and/or degradation at the general classifier(s) which are induced by the site specific attributes.

Moreover, while it may be possible to adapt and train each general classifier to learn its site specific visual attributes in attempt to overcome them and improve its detection performance at the specific site, such adaptation and training may be highly costly in terms of training computing resources and/or time since the general classifier is complex and computing resource intensive. The site-specific filter classifier(s), on the other hand, are significantly more light-weight compared to the complex general classifier(s) and may therefore require significantly reduced computing resources for their training.

Furthermore, deploying a plurality of site-specific filter classifiers in each of one or more sites where each site-specific filter classifier is adapted and trained accordingly to filter out false positive detections under different conditions, different events, and/or the like may enable each site-specific filter classifier to evolve and specialize in a specific well defined operational zone, range, and/or region thus further improve detection performance.

In addition, further training one or more site-specific filter classifiers online, post deployment, may further increase classification performance of the site-specific filter classifier(s) which in turn may further improve detection performance.

Also, further training one or more site-specific filter classifiers online, post deployment, using on-site samples estimated to be falsely classified as positive by a general classifier(s), may also significantly increase classification performance of the site-specific filter classifier(s) which in turn may further improve detection performance.

In addition, saving the original image data which lead to the false positives detection, may support fast adaptation of the on-site filter classifier(s), when a new general (non-site specific) classifier(s) is deployed to the site. The new general classifier(s) feature extraction mechanism may be used to create site-specific false positive features from the saved image samples and a new filter classifier(s) may be trained as part of the deployment process. This may significantly expedite operational deployment of the newly deployed general classifier(s) to the specific site since there is no need to collect new image samples for training the new classifier(s), a process which may be time consuming and may thus extend the training phase.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
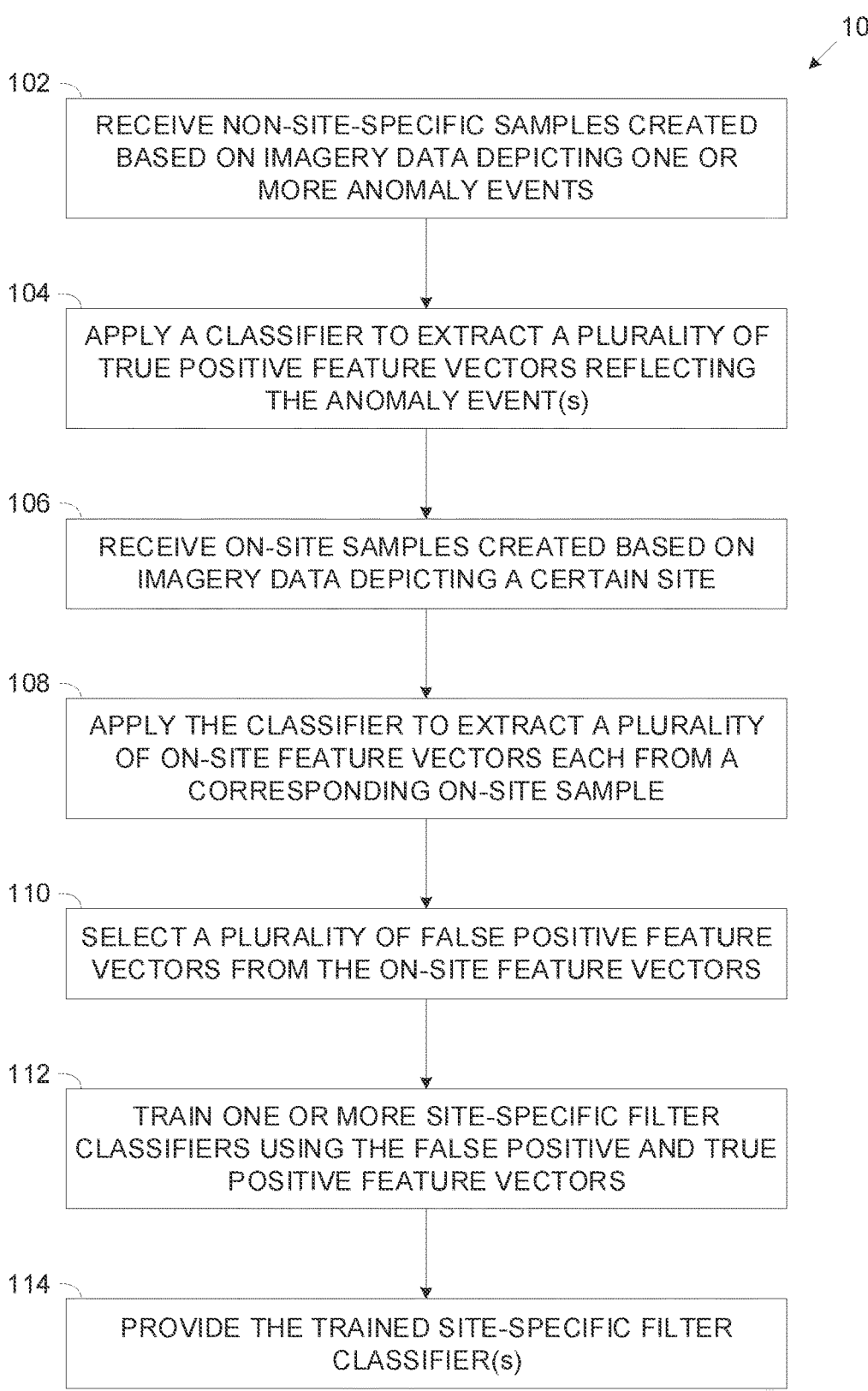
FIG. 1 is a flowchart of an exemplary process of training site-specific filter classifiers to filter out false positive classification of anomaly events detected in a certain site, according to some embodiments of the present invention.

Referring now to the figures, FIG. 1 is a flowchart of an exemplary process of training site-specific filter classifiers to filter out false positive classification of anomaly events detected in a certain site, according to some embodiments of the present invention.

An exemplary process 100 may be executed to filter out false positive detections of predefined anomaly events made by one or more classifiers deployed in a certain site (location) in order to increase performance of the anomaly events classification and detection, for example, accuracy, reliability, consistency, and/or the like.

In particular, the classifier(s) configured and trained to classify and detect the predefined anomaly event(s) based on analysis of imagery data, for example, images, video streams, and/or the like captured in the certain site (location) are general and thus non-site-specific classifiers, i.e., not specifically adapted and trained for the certain site.

Filtering false positive detections may be done using one or more site-specific (location specific) filter classifiers which are specifically adapted and customized for a specific certain site. Such site-specific filter classifier(s) may be trained to further analyze positive classifications of the anomaly event(s) estimated in the certain site by the non-site-specific classifier(s) and filter out detections which are estimated to be false positive.

The site-specific filter classifier(s) may be trained using positive samples reflecting the predefined anomaly event(s) and negative samples which do not reflect the anomaly event(s). Since it is highly improbable that the anomaly event(s) will take place (occur) at the specific certain site, at least during a certain time period during which the site-specific filter classifier(s) are trained, positive detections of the predefined anomaly events by the non-site specific classifier(s) may be used as false positives since they are assumed to actually be negatives. Positive training samples which really depict the predefined anomaly event(s) may be therefore collected offline in one or more sites not necessarily related to the certain site targeted by the site-specific filter classifier(s). Negative samples, on the other hand, may be collected at the certain site during the certain time period during which all detections of the non-site specific classifier(s) are assumed negative, including samples classified as positive, which as stated are considered negative samples.

Figure 2:
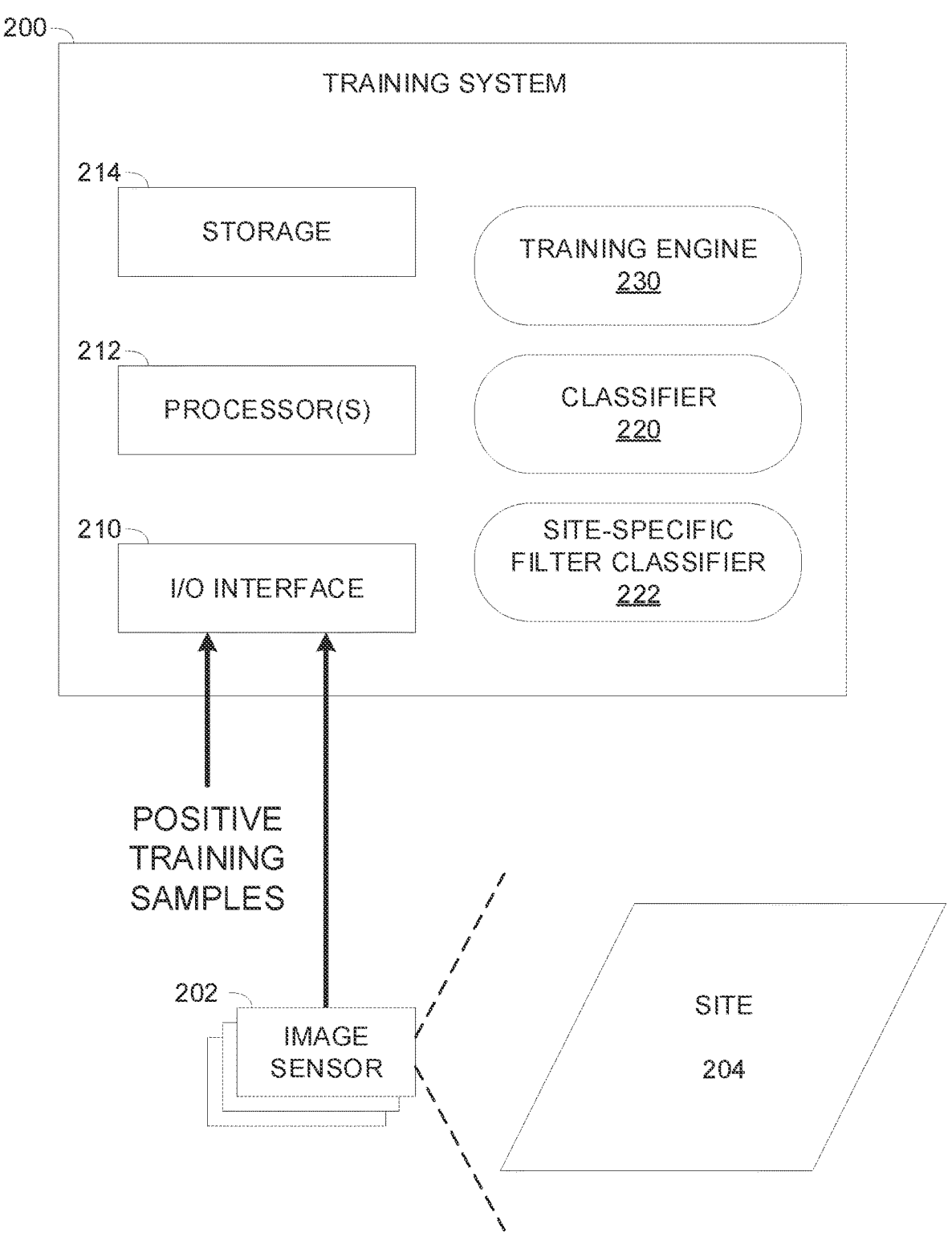
FIG. 2 is a schematic illustration of an exemplary system for training site-specific filter classifiers to filter out false positive classification of anomaly events detected in a certain site, according to some embodiments of the present invention.

Reference is also made to FIG. 2, which is a schematic illustration of an exemplary system for training site-specific filter classifiers to filter out false positive classification of anomaly events detected in a certain site, according to some embodiments of the present invention.

An exemplary training system 200 may execute the process 100 for training one or more site-specific filter classifiers 222 to filter out false positive classifications of one or more predefined anomaly events made by one or more general non-site-specific classifiers 220 based on imagery data capsuled by one or more image sensors 202 deployed to monitor a certain site (location) 204 and/or part thereof.

The general non-site-specific classifier(s) 220 is interchangeably designated herein after as general classifier 220, non-site-specific classifier 220 or simply classifier 220.

The training system 200, for example, a server, a processing node, a cluster of processing nodes, and/or the like may comprise an Input/Output (I/O) interface 210, a processor(s) 212 for executing the process 100, and a storage 214 for storing data and/or code (program store).

The I/O interface 210 may include one or more wired and/or wireless I/O interfaces, for example, a Universal Serial Bus (USB) port, a serial port, a Bluetooth (BT) interface, a Radio Frequency (RF) interface, and/or the like for communicating and/or attaching to one or more external devices and/or attachable devices. The I/O interface may further include one or more network adapters, interfaces, ports, and/or links for connecting to one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

Via the I/O interface 210, the training system 200 may communicate with the image sensor(s) 202 deployed to monitor at least part of the site 204, for example, a camera, a video camera, an infrared sensor, a thermal imaging sensor, a night vision sensor, and/or the like to receive imagery data captured by the image sensor(s) 202, for example, an image, a video stream (sequence), and/or the like depicting the site 204 and/or part thereof.

Moreover, the training system 200 may receive, via the I/O interface 210, training samples, for example, imagery data samples, specifically positive training samples depicting the predefined anomaly event(s).

The predefined anomaly event(s) may comprise one or more events, attributes and/or behavior of one or more objects depicted in the image samples.

The predefined anomaly event(s) may include, for example, one or more emergency events such as, for example, an accident (e.g., car accident, personal accident, etc.), an injury, a fire, a flood, a collapse of a structure, and/or the like. In another example, the predefined anomaly event(s) may include one or more violence events such as, for example, a fight, a burglary, a theft, a shootout, and/or the like. In another example, the predefined anomaly event(s) may include one or more public order violation events such as, for example, vandalism, a riot, and/or the like. In another example, the predefined anomaly event(s) may include one or more nature anomaly events such as, for example, a storm, a tornado, a tsunami, and/or the like.

The positive training samples may therefore comprise imagery data, i.e., image samples, for example, images, video streams, and/or the like depicting actual occurrences, simulations, emulations, and/or a combination thereof of one or more of the anomaly events.

The positive training samples may be received from one or more sources. For example, the training system 200 may communicate, via the I/O interface 210, with one or more remote networked resources, for example, a server, a storage device, a cloud service, and/or the like to receive one or more positive training samples. In another example, the training system 200 may retrieve one or more positive training samples from one or more attachable storage devices, for example, an USB storage media, another computing device, and/or the like attached and/or connected to the I/O interface 210.

The processor(s) 212, homogenous or heterogeneous, may include one or more processing nodes and/or cores arranged for parallel processing, as clusters and/or as one or more multi core processor(s).

The storage 214 may include one or more non-transitory persistent storage devices, for example, a ROM, a Flash array, a Solid State Drive (SSD), a hard drive (HDD), and/or the like. The storage 214 may also include one or more volatile devices, for example, a RAM component, a cache, and/or the like. The storage 214 may further comprise one or more network storage devices, for example, a storage server, a Network Accessible Storage (NAS), a network drive, a database server and/or the like accessible through the I/O interface 210.

The processor(s) 212 may execute one or more software modules such as, for example, a process, a script, an application, an agent, a utility, a tool, an Operating System (OS), and/or the like each comprising a plurality of program instructions stored in a non-transitory medium (program store) such as the storage 214 and executed by one or more processors such as the processor(s) 212.

The processor(s) 212 may optionally further, integrate, utilize and/or facilitate one or more hardware elements (modules) integrated and/or utilized in the training system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof.

For example, the processor(s) 212 may execute a training engine 230 to execute the process 100 for training one or more site-specific filter classifiers 222 to filter out false positive classifications (detection) of the predefined anomaly event(s) by the general classifier(s) 220 based on imagery data captured by the image sensor(s) 202.

It should be noted, that the process 100 and/or part thereof executed by the training engine 230 may be executed by the processor(s) 212 such that any one or more processors of the processor(s) 212 may execute the process 100 and/or part thereof or optionally not participate in execution of the process 100.

The non-site-specific classifier(s) 220 is general in the sense that it is not specifically adapted and/or customized for any specific location (site) but is rather adapted and trained to classify and detect the predefined anomaly event(s) regardless of the location (site) in which the anomaly event(s) occur. The non-site-specific classifier(s) 220 may be therefore trained using one or more non-site-specific training datasets comprising a plurality of training image samples, for example, images, video frames, and/or the like captured in one or more locations not necessarily related to the certain site 204. The non-site-specific training samples may comprise positive samples each depicting one or more of the predefined anomaly event(s) and negative samples which do not depict any of the predefined anomaly event(s).

The site-specific filter classifier(s) 222 on the other hand are specifically adapted and trained to filter out false positive classifications (detections) made by the non-site-specific classifier(s) 220 in the specific certain site 204.

The non-site-specific classifier(s) 220 and the site-specific filter classifier(s) 222 may be implemented using one or more ML models, methods, architectures and/or implementations as known in the art, for example, a Neural Network (NN), a Deep Neural Network (DNN), a Support Vector Machine (SVM), and/or the like.

Typically, the general non-site-specific classifier(s) 220 may be more complex and/or more resource consuming compared to the site-specific filter classifier(s) 222 which may be a light weight classifier utilizing reduced computing resources, for example, processing resources (processing power), processing time, storage resources, and/or the like.

Imagery analysis classifiers such as the non-site-specific classifier(s) 220 may include feature extraction functionality and classification functionality. Feature extraction which comprises analysis of imagery data (images, video frames, etc.) and creating feature vectors comprising visual features extracted from the imagery data may be significantly complex thus computing resource intensive while classification of the feature vectors may utilizing significantly reduced computing resources. For example, a non-site-specific classifier 220 may be implemented by a neural network divided to two parts, internal layers implementing feature extraction, for example, local feature extraction such as, for example, Scale-Invariant Feature Transform (SIFT), Histogram Of Oriented Gradients (HOG), and/or the like and one or more last layers implementing a linear classifier. In another example, a non-site-specific classifier 220 may implement a Haar features extractor for digital image feature extraction and an Adaptive Boosting (AdaBoost) classifier.

The site-specific filter classifier 222 on the other hand may not include feature extraction capabilities but rather comprise only classification functionality for classifying feature vectors, created by the non-site-specific classifier(s) 220, may be therefore significantly more light weight.

It should be noted, that feature extraction and classification may be done using one or more methods, techniques, algorithms, and/or tools as known in the art and is out of scope of the present disclosure.

According to some embodiment the site-specific filter classifier(s) 222 may be independent of the non-site-specific classifier(s) 220. For example, the site-specific filter classifier(s) 222 may be implemented by one or more neural networks separate from one or more other neural networks implementing the non-site-specific classifier(s) 220.

However, in some embodiments, the site-specific filter classifier(s) 222 may be integrated in the non-site-specific classifier(s) 220. For example, as described herein before, a neural network implementing a non-site-specific classifier 220 may comprise feature extraction layers and classification layers and may further comprise one or more additional external layers implementing a site-specific filter classifier 222. Moreover, the training system 200, specifically, the processor(s) 212 may execute both the non-site-specific classifier(s) 220 and the site-specific filter classifier(s) 222. However, in some embodiments, the non-site-specific classifier(s) 220 and the site-specific filter classifier(s) 222 may be execute by two separate computing systems, for example, a server, a processing node, a cloud service, and/or the like each comprising computing, storage and optionally I/O resources such as the processor(s) 212, the storage 214 and the I/O interface 210.

Optionally, the training system 200 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like. In such case the cloud based training system 200 may communicate with the image sensor(s) 202 via one or more networks to receive the imagery data captured by the image sensor(s) 202 to depict the site 204.

For brevity, the process 100 is described for training the site-specific filter classifier(s) 222 to filter out classifications and detections of one or more predefined anomaly events by a single non-site-specific classifier 210 deployed in the site 204. This, however, should not be construed as limiting since, as may be apparent to a person skilled in the art, the process 100 may be expanded to train the site-specific filter classifier(s) 222 to filter out classifications and detections made by multiple non-site-specific classifier 210.

Moreover, the process 100 is described for training the site-specific filter classifier(s) 222 to filter out classifications of predefined anomaly events detected in a single site 204. This, however, should not be construed as limiting since, as may be apparent to a person skilled in the art, the process 100 may be duplicated, extended, and/or scaled to train the site-specific filter classifier(s) 222 to filter out classifications of the predefined anomaly events in multiple monitored sites.

As shown at 102, the process 100 starts with the training engine 230 receiving imagery data, for example, images, video frames, image maps (e.g., thermal maps, edge images, etc.), and/or the like reflecting, i.e., depicting the predefined anomaly event(s), for example, emergency events, violence events, public order violation events, nature anomaly events, and/or the like.

The received imagery data may comprise a plurality of non-site-specific image samples depicting the predefined anomaly event(s) in one or more locations not necessarily related to the site 204. Since they depict the predefined anomaly event(s), the received non-site-specific samples may be considered positive samples and designated accordingly.

The positive samples may optionally be part of one or more non-site-specific training datasets used to train, validate and/or test the non-site-specific classifier 220.

As shown at 104, the training engine 230 may extract a plurality of feature vectors each corresponding to one of the non-site-specific samples.

For example, the training engine 230 may apply the non-site-specific classifier 220 which, as described herein before, is adapted and/or configured to apply feature extraction, for example, Haar, SIFT, HOG, local binary pattern (LBP), and/or the like to extract a plurality of features, specifically visual features, from each of the non-site-specific samples. The classifier 220 may then create a plurality of feature vectors each comprising the features extracted from the corresponding non-site-specific sample.

Since the plurality of feature vectors correspond to the non-site-specific samples which are positive samples reflecting the anomaly event(s), the training engine 230 may annotate these feature vectors accordingly as true positive feature vectors by associating each such true positive feature vector with a label indicative that the respective feature vector is positive. Optionally, the label associated with one or more of the true positive feature vectors may be further indicative of the predefined anomaly event seen (depicted) in the corresponding non-site-specific positive sample.

Moreover, since the false positive feature vectors, i.e., the selected on-site feature vectors having an exceeding classification score, are assumed false positive and are thus negative, the training engine 230 may automatically annotate these on-site feature vectors as negative feature vectors with no manual and/or other human intervention.

Figure 3:
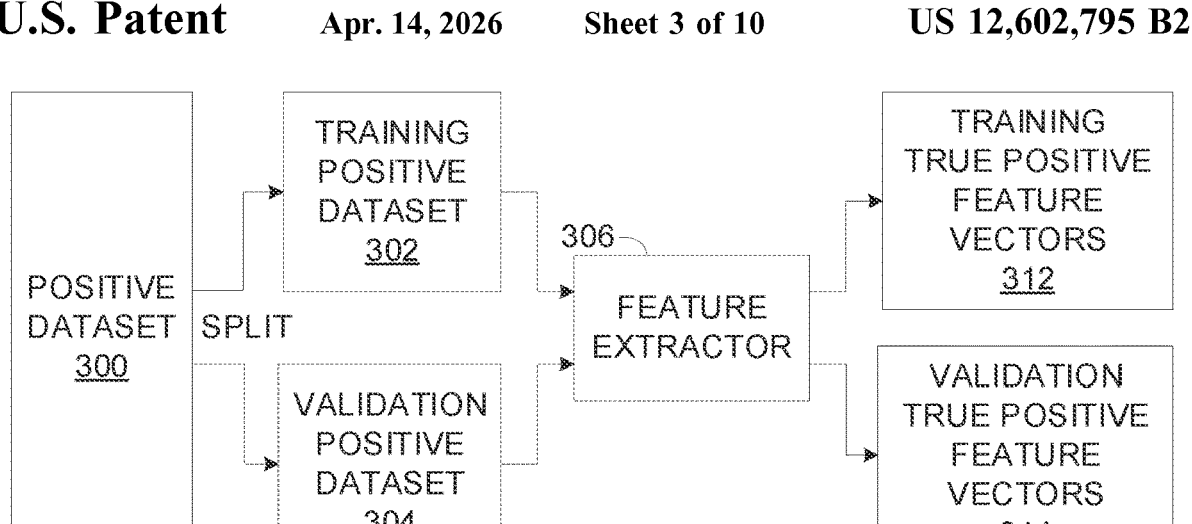
FIG. 3 is a schematic illustration of an exemplary sequence of preparing offline data to create positive samples for training site-specific filter classifiers to filter out false positive classification of anomaly events detected in a certain site, according to some embodiments of the present invention.

Reference is now made to FIG. 3, which is a schematic illustration of an exemplary sequence of preparing offline data to create positive samples for training site-specific filter classifiers to filter out false positive classification of anomaly events detected in a certain site, according to some embodiments of the present invention.

An exemplary sequence 300 following steps 102-104 of the process 100, may be executed to collect representation of positive class examples, i.e., positive samples reflecting the predefined anomaly event(s) and create a plurality of corresponding positive training feature vectors which may be later used for training one or more site-specific filter classifiers such as the site-specific filter classifier 222.

The sequence 300 which may be typically conducted offline, for example, by a training engine such as the training engine 230, may include receiving a positive dataset 300 comprising a plurality of positive samples, for example, images, video frames, and/or the like, which as describe herein before may be non-site-specific and thus not necessarily related to a specific site such as the site 204.

The positive dataset 300 may optionally be part of one or more training datasets used to train, validate and/or test a non-site-specific filter classifier such as the non-site-specific classifier 220.

The training engine 230 may optionally split the positive dataset to two subsets, a first subset constituting a training positive dataset 302 comprising a plurality of positive training samples which may be used for training the site-specific filter classifier(s) 222 and a second subset for a validation positive dataset 304 comprising a plurality of positive validation samples which may be used for validating the trained site-specific filter classifier(s) 222.

The training engine 230 may apply one or more feature extractors 306, for example, Haar feature extractor, SIFT, HOG, LBP, and/or the like to extract a plurality of visual features from each of the positive training samples and create a plurality of positive feature vectors corresponding to the positive training samples. In particular, the training engine 230 may create a plurality of training true positive feature vectors 312 corresponding to the positive training samples 302 and a plurality of validation true positive feature vectors 314 corresponding to the positive validation samples 304.

The training engine 230 may further annotate each of the true positive feature vectors 312 and true positive validation feature vectors 314 accordingly to include a label indicating that the respective true positive feature vectors is positive and optionally further indicate the anomaly event (or attributes) reflected in its corresponding positive sample.

As describe herein after, in further detail, the true positive training feature vectors 312 may be used to train the site-specific filter classifier(s) 322 while the true positive validation feature vectors 314 may be used for validating the trained site-specific filter classifier(s) 322, for example, to fine-tune a decision threshold of the site-specific filter classifier(s) 322.

Reference is made once again to FIG. 1.

As shown at 106, the training engine 230 may receive a plurality of on-site samples, for example, images, video frames, image maps, and/or the like captured by the image sensor(s) 202 and thus depicting the certain site 204 and/or part thereof.

As shown at 108, the training engine 230 may extract a plurality of feature vectors each corresponding to one of the on-site samples.

For example, the training engine 230 may apply the non-site-specific classifier 220 to extract a plurality of features, specifically visual features, from each of the on-site samples. The classifier 220 may then create a plurality of on-site feature vectors each comprising the features extracted from the corresponding on-site sample.

Since the predefined anomaly event(s) is unlikely to take place (occur) at the site 204 during a limited time period (e.g., day, week, month) during which data is collected for training the site-specific filter classifier(s) 222, it is assumed that none of the on-site samples captured in the site 204 reflects (depicts) the predefined anomaly event(s). The on-site samples may be therefore designated negative samples.

The trained non-site-specific classifier 220 applied to the on-site samples may extract features from the on-site samples and extract and/or create a plurality of on-site feature vectors corresponding to the on-site samples.

The trained non-site-specific classifier 220 may then classify each of the on-site feature vectors as positive or negative. For example, the non-site-specific classifier 220 may compute a classification score or a probability score for each classified on-site feature vector which indicates a probability of correct classification of the respective on-site feature vector as positive or negative. The classification score of each on-site feature vector may be compared to a classification threshold computed, set, defined and/or otherwise applied for the non-site-specific classifier 220 to determine whether a respective feature vector is estimated (predicted) to be positive or negative. For example, each feature vector having a classification score exceeding the classification threshold may be determined a positive feature vector and each feature vector having a classification score below (not exceeding) the classification threshold may be determined a negative feature vector.

However, since it is assumed that all on-site samples are negative, obviously each on-site feature vector classified by the non-site-specific classifier 220 as positive may be considered (regarded) false positive, meaning that it is classified as positive, while in reality the respective on-site feature vector is negative.

As shown at 110, the training engine 230 may select a plurality of false positive feature vectors from a subset of the plurality of on-site feature vectors.

Specifically, the training engine 230 may select a plurality of on-site feature vectors from the subset of on-site feature vectors classified by the non-site-specific classifier 220 as positive which are in fact false positive. For example, the training engine 230 may select false positive feature vectors from the subset of on-site feature vectors having a classification score that exceeds the classification threshold defined for the non-site-specific classifier 220.

The training engine 230 may annotate these false-positive feature vectors accordingly as false positive feature vectors by associating each such false positive feature vector with a label indicative that the respective feature vector is negative.

Optionally, in order to establish a dataset of false positive feature vectors which is sufficiently large for effective training of the site-specific filter classifier(s) 222, the training engine 230 may aggregate, and/or collect a number of false positive feature vectors classified as such by the non-site-specific classifier 220 which exceeds a predefined minimal number, for example, 100, 200, 300, and/or the like.

Optionally, in order to establish a dataset of false positive feature vectors which is sufficiently large and/or diverse for effective training of the site-specific filter classifier(s) 222, the training engine 230 may aggregate, and/or collect false positive feature vectors classified as such by the non-sitespecific classifier 220 during a time period exceeds a predefined minimal time period, for example, 1 day, 2 days, 3 days, and/or the like.

Figure 4:
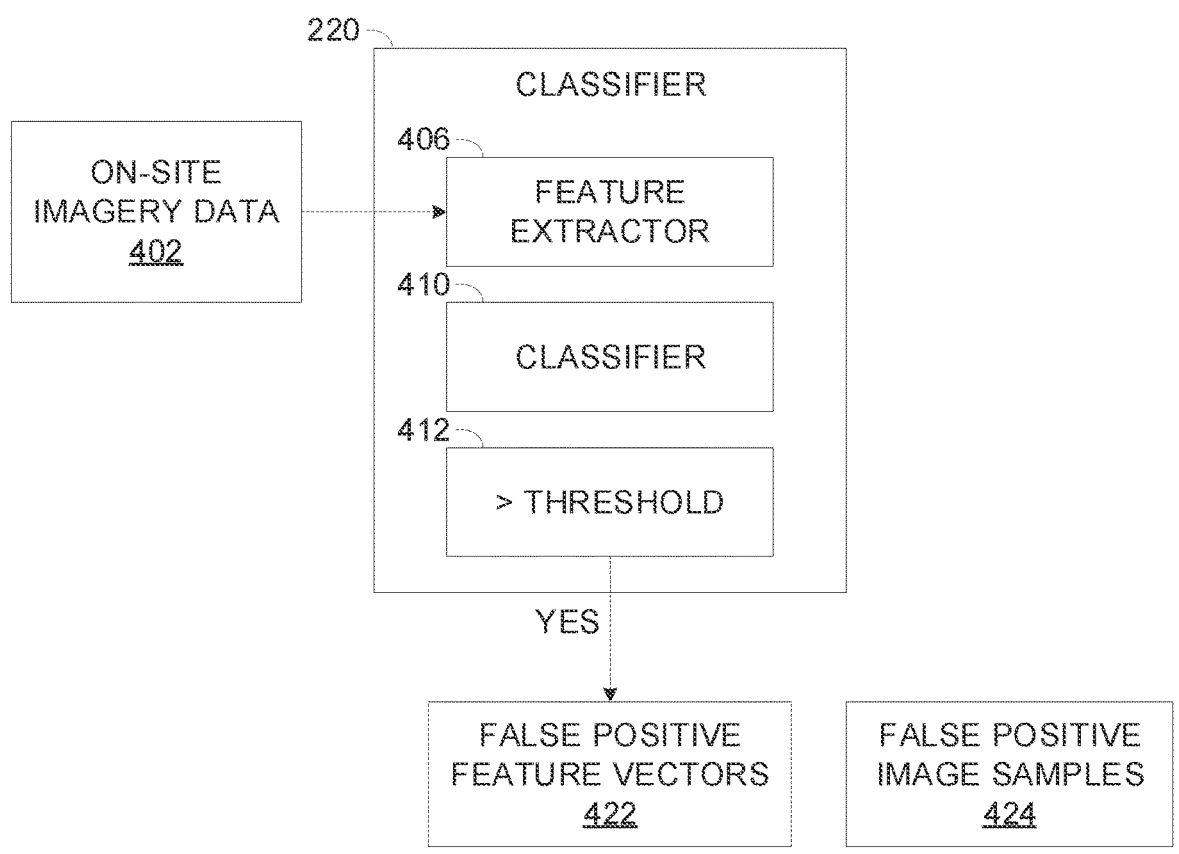
FIG. 4 is a schematic illustration of an exemplary sequence of collecting online data to create negative samples for training site-specific filter classifiers to filter out false positive classification of anomaly events detected in a certain site, according to some embodiments of the present invention.

Reference is now made to FIG. 4, which is a schematic illustration of an exemplary sequence of collecting online data to create negative samples for training site-specific filter classifiers to filter out false positive classification of anomaly events detected in a certain site, according to some embodiments of the present invention.

An exemplary sequence 400 following steps 106-110 of the process 100, may be executed to collect representation of negative class examples, i.e., negative samples which do not reflect the predefined anomaly event(s), and create a plurality of corresponding negative training feature vectors which may be later used for training one or more site-specific filter classifiers such as the site-specific filter classifier 222.

The sequence 400 may be conducted online, for example, by a training engine such as the training engine 230 post deployment of the non-site-specific classifier 220 and the site-specific filter classifier 222 to monitor a site such as the site 204 in order to detect one or more predefined anomaly events.

As seen, the non-site-specific classifier 220 may receive on-site imagery (visual) data 402 comprising a plurality of on-site image samples, for example, an image, a video frame, an imaging map, and/or the like captured by one or more image sensors such as the image sensors 202. As described herein before these on-site samples are assumed to be negative samples not reflecting (depicting) the predefined anomaly event(s).

The non-site-specific classifier 220 may process each incoming on-site image sample in several processing stages, which may include, for example, object detection, object attributes classification, object behavior classification (event/action recognition), frame classification.

For example, the non-site-specific classifier 220 may comprise a feature extractor 406 utilizing one or more feature extractions algorithms, techniques and/or methods for extracting image (visual) features from the on-site samples, for example, Haar, SIFT, HOG, LBP, and/or the like.

A plurality of on-site feature vectors corresponding to the on-site samples may be created, for example, by the non-site-specific classifier 220 may create, where each on-site feature vector comprises features extracted from a corresponding on-site sample.

The non-site-specific classifier 220 may comprise one or more classifiers 410 utilized by one or more trained ML models for classifying each of the on-site feature vectors. The ML model(s) 410 adapted and trained for classifying visual feature vectors may implement one or more classification algorithms, techniques and/or methods, for example, linear classification, linear regression, naive Bayes, k-nearest neighbor, AdaBoost, and/or the like. The classifier 410 may compute a classification score for each classified on-site feature vector.

The classification score computed for each of the on-site feature vectors may be compared to a classification threshold 412 (which may optionally equal the classifier's positive/negative decision threshold) to determine whether the respective on-site feature vector is estimated positive or negative. For example, an on-site feature vector having a classification score exceeding (or equal) the classification threshold 412 may be determined positive while an on-site feature vector having a classification score below the classification threshold 412 may be determined negative.

As seen, a subset of on-site feature vectors determined positive, i.e., having classification score exceeding (or equal) the classification threshold 412, may be considered false positive feature vectors since they correspond to on-site samples assumed to be negative. A plurality of false positive feature vectors 422 may be therefore selected for training the site-specific filter classifier 222.

Optionally, on-site samples (images) corresponding to the selected false positive feature vectors 422, and are thus considered false positive images 424, i.e., negative images no reflecting the predefined anomaly event(s), may be also stored for later use as described in detail herein after.

Reference is made once again to FIG. 1.

As shown at 112, the training engine 230 may train one or more site-specific filter classifiers 222 using the plurality of false positive feature vectors and the plurality of true positive feature vectors extracted, selected and/or collected as described in steps 104 and 110.

The training engine 230 may use one or more training methodologies as for training site-specific filter classifier(s) 222 to filter out false positive classifications (detections) of the non-site-specific classifier 220, in particular, supervised training, and/or semi-supervised training using the annotated false positive feature vectors extracted from the negative on-site image samples vectors and the annotated true positive feature vectors extracted from the subset of positive non-site-specific image samples.

For effective training of the site-specific filter classifier(s) 222, the training of the site-specific filter classifier(s) 222, the engine 230 may split the training dataset comprising the annotated false positive feature vectors and the annotated true positive feature vectors into two subsets, a training subset and a validation subset.

The training subset may comprise a first group of false positive feature vectors selected from the plurality of false positive feature vectors, and a first group of true positive feature vectors selected from the plurality of true positive feature vectors. The validation subset may comprise a second group of false positive feature vectors selected from the plurality of false positive feature vectors, and a second group of true positive feature vectors selected from the plurality of true positive feature vectors.

In particular, the training engine 230 may divide the training dataset such that the feature vectors of each first group do no overlap with the feature vectors of a corresponding second group. Effectively splitting the training dataset may significantly improve classification performance of the trained site-specific filter classifier(s) 222, for example, accuracy, reliability, consistency, robustness, prevent over-fitting, and/or the like.

For example, the training engine 230 may use the training subset to train the site-specific filter classifier(s) 222 while using the validation subset to set a filter threshold for the site-specific filter classifier(s) 222 which is used to estimate, and/or predict whether each feature vector is positive or negative.

The site-specific filter classifier(s) 222 may compute a filter classification score for each classified feature vector which is indicative of probability of correct classification of the respective feature vector as positive or negative. The classification score of each feature vector may be compared to the filter threshold computed, set, defined and/or otherwise applied for the site-specific filter classifier(s) 222 to determine whether a respective feature vector is estimated (predicted) to be positive or negative.

Using the validation subset on the trained site-specific filter classifier(s) 222, the training engine 230 may therefore, adjust, adapt, and/or fine-tune the filter threshold to improve and/or optimize performance based on one or more performance parameters and/or metrics, for example, accuracy, precision, recall, F-Score, and/or the like.

Optionally, adjustment of the filter threshold may be done in an iterative process comprising multiple adjustment iterations. In each iteration, after setting and/or adjusting the filter threshold, the site-specific filter classifier(s) 222 is applied again to the validation subset and/or part thereof and performance of the site-specific filter classifier(s) 222 is re-evaluated. This iterative process may be repeated until converging to an optimal filter threshold and/or until reaching a certain break criteria, for example, a predefined number of iterations, a predefined training time, lack of convergence, and/or the like.

Optionally, the training engine 230 may divide the training dataset into three non-overlapping subsets such that a first subset may be used for training the site-specific filter classifier(s) 222, a second subset may be used to validate the site-specific filter classifier(s) 222, and a third subset may be used to test the site-specific filter classifier(s) 222.

Optionally, the training engine 230 may train a plurality of site-specific filter classifiers 222 deployed to filter false positive classifications (detections) of the predefined anomaly event(s) by the non-site-specific classifier 220. For example, the training engine 230 may train a plurality of site-specific filter classifier 222 to filter out false positive classifications of the predefined anomaly event(s) under different environmental conditions.

For example, multiple site-specific filter classifiers 222 may be each adapted, configured and trained accordingly by the training engine 230 to filter out false positive detections of the classifications of the predefined anomaly event(s) during a respective environmental condition, for example, day, night, high-visibility, fog, rain, temperature range (e.g., hot, cold, etc.), and/or the like.

To this end, the training engine 230 may use suitable training samples selected from the plurality of false positive and true positive feature vectors. For example, the training engine 230 may select false positive and true positive feature vectors relating to one or more predefined anomaly events which are extracted from image samples depicting the predefined anomaly event(s) in day light (in high light conditions) to train a first site-specific filter classifiers 222 adapted to filter out false positive classifications of the predefined anomaly event(s) detected by the non-site specific classifier 220 in day time. In another example, the training engine 230 may select false positive and true positive feature vectors relating to these predefined anomaly event(s) which are extracted from image samples depicting the predefined anomaly event(s) at night (in darkness conditions) to train a second site-specific filter classifiers 222 adapted to filter out false positive classifications of the predefined anomaly event(s) detected by the non-site specific classifier 220 in night time.

In another example, each of one or more site-specific filter classifiers 222 may be adapted, configured and trained accordingly by the training engine 230 to filter out false positive detections of the respective predefined anomaly event. For example, a first site-specific filter classifier 222 may be adapted to filter false positive classifications of a first predefined anomaly event, for example, fires, while a second site-specific filter classifier 222 may be adapted to filter false positive classifications of a second predefined anomaly event, for example, car accidents.

Again, to this end, the training engine 230 may use suitable training samples selected from the plurality of false positive and true positive feature vectors. For example, the training engine 230 may select false positive and true positive feature vectors relating to the first predefined anomaly event for training the first site-specific filter classifier 222, and select false positive and true positive feature vectors relating to the second predefined anomaly event for training the second site-specific filter classifier 222.

Figure 5:
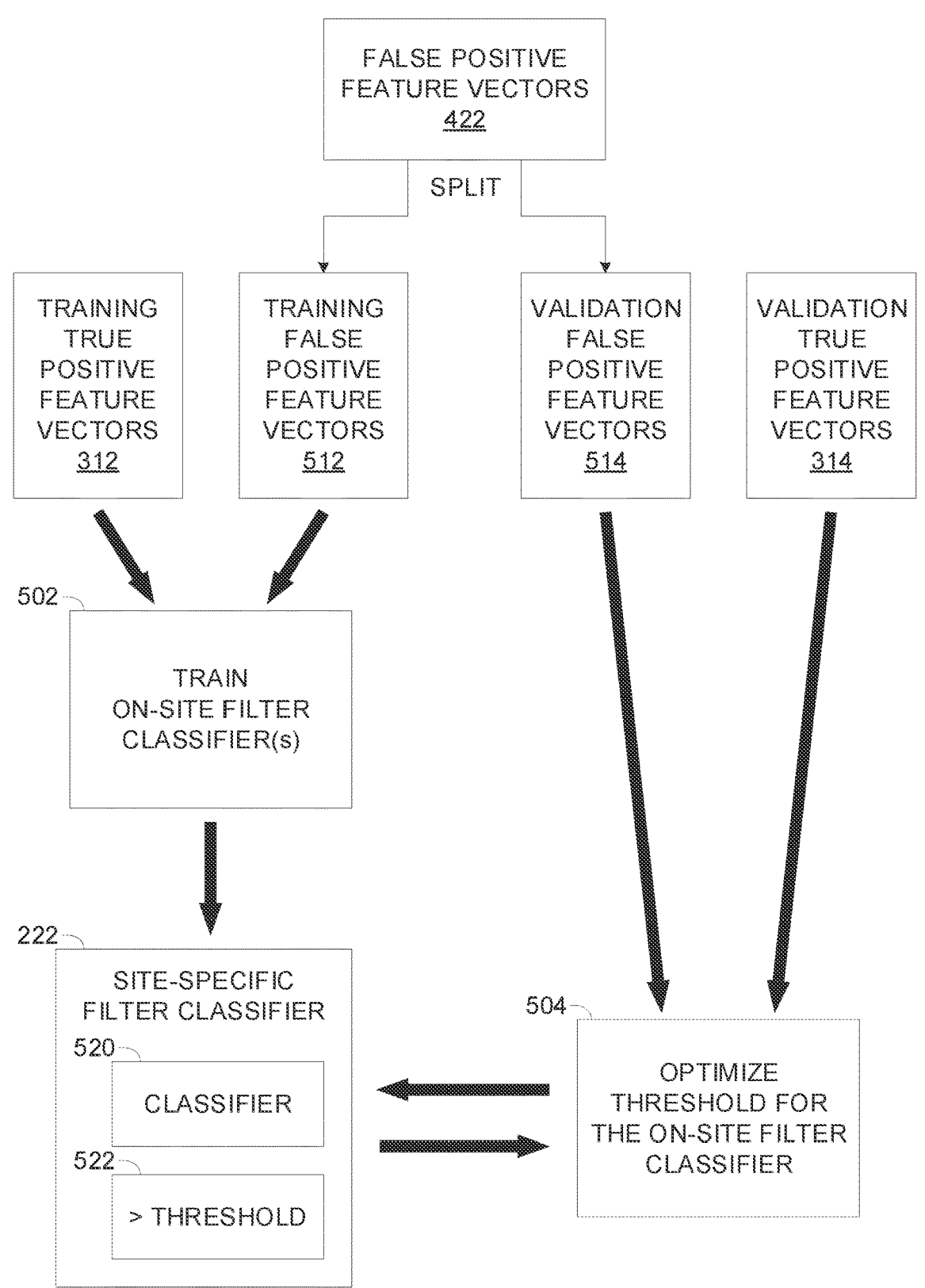
FIG. 5 is a schematic illustration of an exemplary sequence of training site-specific filter classifiers to filter out false positive classification of anomaly events detected in a certain site, according to some embodiments of the present invention.

Reference is now made to FIG. 5, which is a schematic illustration of an exemplary sequence of training site-specific filter classifiers to filter out false positive classification of anomaly events detected in a certain site, according to some embodiments of the present invention.

An exemplary sequence 500 illustrating step 112 of the process 100, may be executed to train one or more site-specific filter classifiers such as the site-specific filter classifier 222 for filtering out false positive classifications (detections) of one or more predefined events by a non-site-specific classifier such as the classifier 220.

The sequence 500 may be conducted online, for example, by a training engine such as the training engine 230 after deployment of the non-site-specific classifier 220 and the site-specific filter classifier 222 to monitor a site such as the site 204.

First, the training engine 230 may split a set of false positives feature vectors such as the false positive feature vectors 422, created and selected as describe in sequence 400 and steps 106-110 of the process 100 into two disjoint subsets, a training subset 512 and a validation subset 514 such that the training subset 512 may comprise a first group of false positive feature vectors and the validation subset 514 may comprise a second group of false positive feature vectors which is not overlapping the first group.

The split and allocation of false positives feature vectors to the two subsets may be done according to one or more methodologies, techniques, and/or flows, for example, randomly, by time, and/or the like and/or a combination thereof. A time based selection may define, for example, that false positive feature vectors extracted from on-site image samples captured from a time 0 to a time T may be selected to the training subset 512 while false positive feature vectors extracted from on-site image samples captured from a time T to a time 2T may be selected to the validation subset 514.

As seen in 502, the training engine 230 may train the site-specific filter classifier(s) 222 using a dataset of training true positive feature vectors such as the training true positive feature vectors 312, and the subset of training false positive feature vectors 512.

As discussed herein before, the site-specific filter classifier(s) 222 may be light weight classifiers as they may not include feature extraction functionality but rather only one or more classifiers 520 such as the classifier 410 and a threshold comparison function 522.

As seen in 504, the training engine 230 may validate the site-specific filter classifier(s) 222, specifically the classifier(s) 520, using a dataset of validation true positive feature vectors such as the validation true positive feature vectors 314, and the subset of validation false positive feature vectors 512. For example, the training engine 230 may adjust, adapt, and/or fine-tune the filter threshold 522 of the site-specific filter classifier(s) 222 to improve and/or optimize performance based on one or more performance parameters and/or metrics, for example, accuracy, precision, recall, F-Score, Area Under the Curve (ACU), and/or the like.

As stated herein before, adjustment of the filter threshold may an iterative process comprising multiple adjustment iterations. For example, the training engine 230 may fine-tune the filter threshold of one or more of the site-specific filter classifier(s) 222 so that the recall on the true positives feature vectors is above a predefined value, for example, 80%, 85%. 90%, 99%, and/or the like.

Optionally, multiple classification architecture, algorithms, and/or techniques, and/or mechanisms may be evaluated for utilizing the site-specific filter classifier(s) 222. The training engine 230 may evaluate the performance of each such classification implementation and may select an optimal performing implementation, optionally according to compliance with one or more performance criteria.

Reference is made once again to FIG. 1.

As shown at 114, the training engine 230 may provide the trained site-specific filter classifier(s) 222 for deployment to filter out false positive classifications of the predefined anomaly event(s) detected in the site 204 by the non-site-specific classifier 210.

For example, the training engine 230 may transmit the trained site-specific filter classifier(s) 222 over one or more networks. via the I/O interface 210, to one or more systems, servers, devices, and/or nodes deployed to monitor the site 204 in order to detect one or more of the predefined anomaly events.

In another example, assuming the training system 200 itself is also adapted to execute the trained site-specific filter classifier(s) 222 to filter out false positive classifications of the predefined anomaly event(s) detected at the site 204 by the non-site-specific classifier 220. In such, case, the training engine 230 may provide the trained site-specific filter classifier(s) 222 for use by one or more detection functional modules executed by the training system 200 and/or indicate availability, operational status, and/or the like of the trained site-specific filter classifier(s) 222 such that it may be used by the detection functional module(s) for detecting the predefined anomaly event(s) at the site 204.

Figure 6:
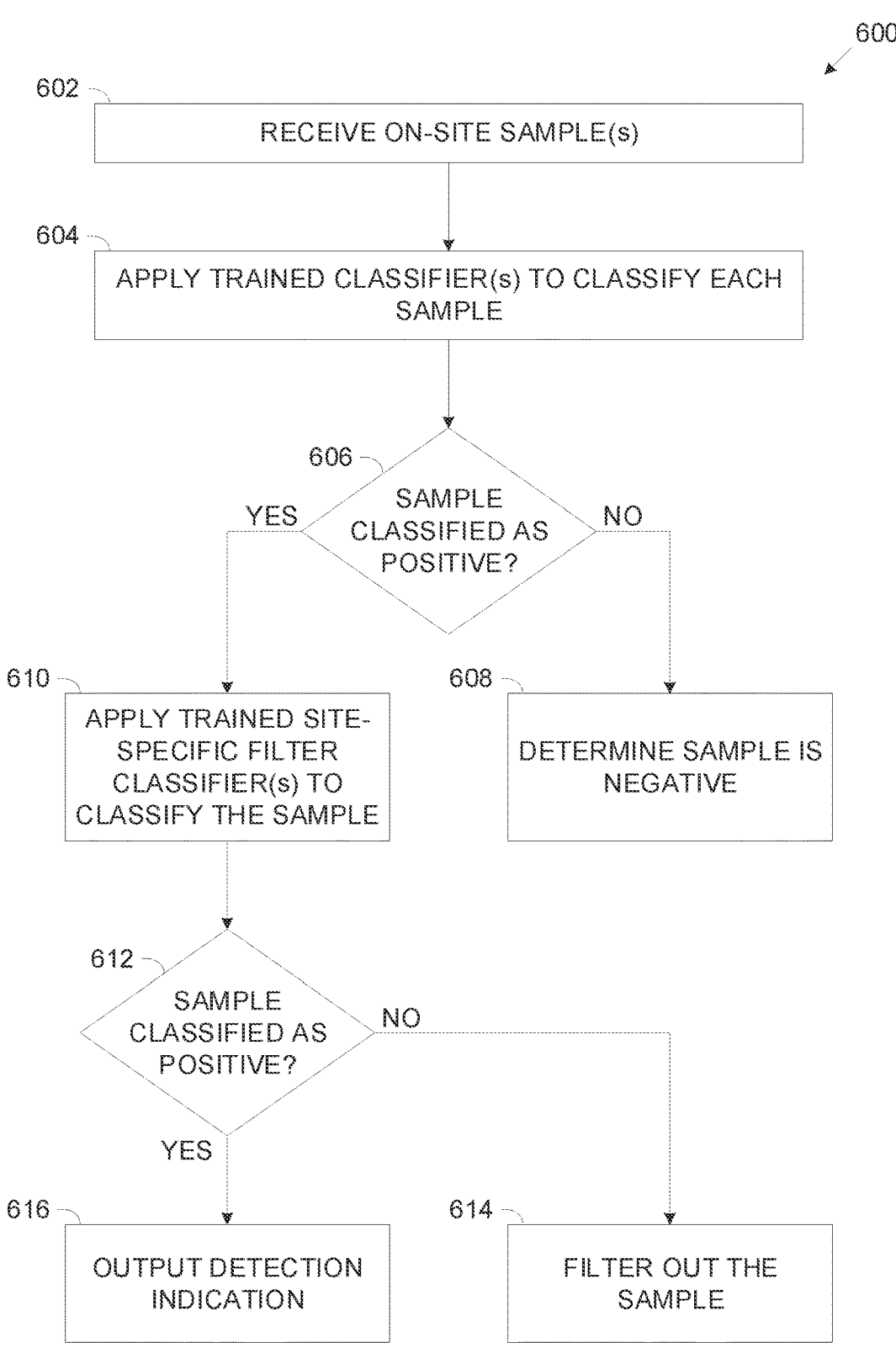
FIG. 6 is a flowchart of an exemplary process of filtering out false positive classification of anomaly events detected in a certain site, according to some embodiments of the present invention.

Reference is now made to FIG. 6, which is a flowchart of an exemplary process of filtering out false positive classification of anomaly events detected in a certain site, according to some embodiments of the present invention.

Figure 7:
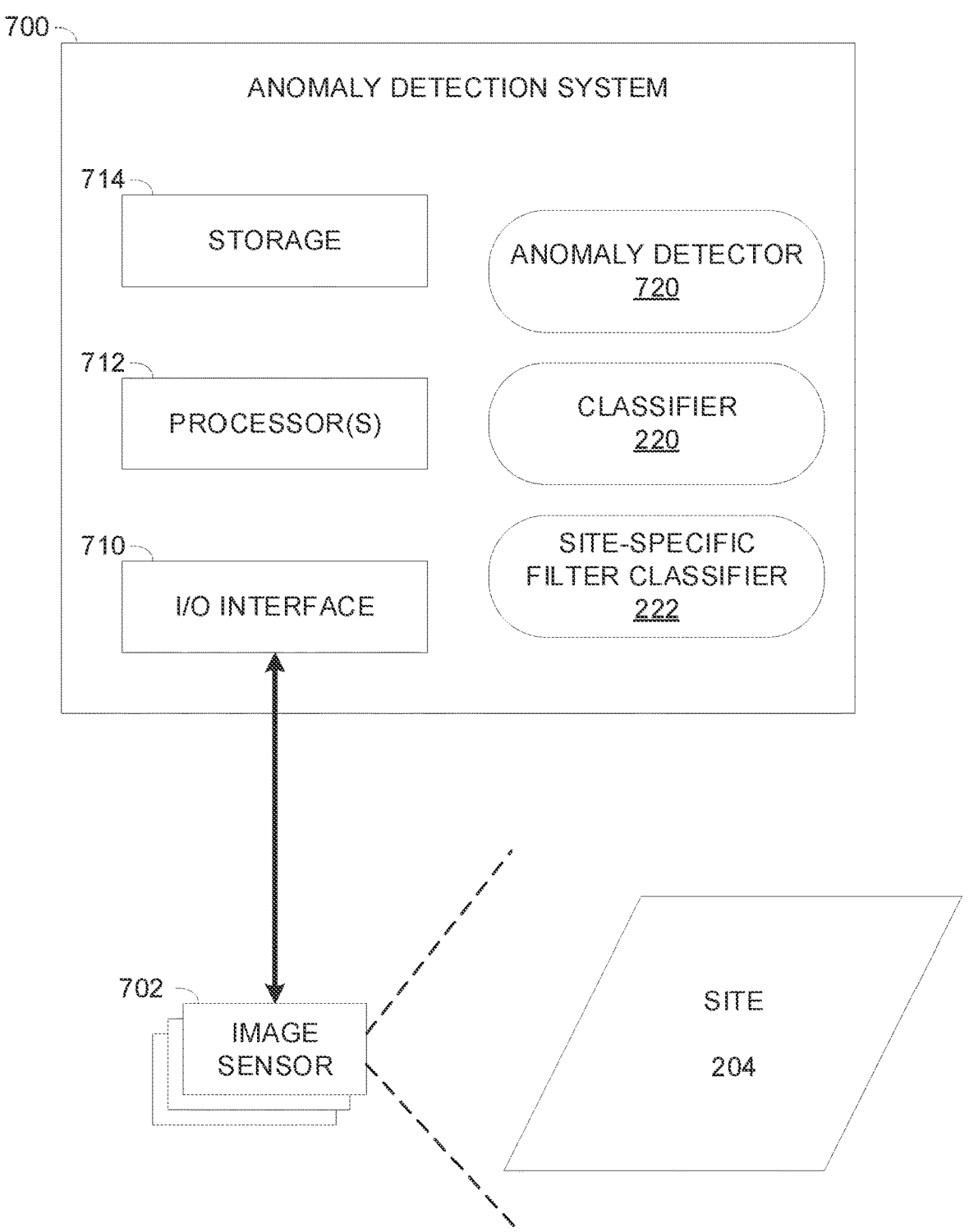
FIG. 7 is a schematic illustration of an exemplary system for filtering out false positive classification of anomaly events detected in a certain site, according to some embodiments of the present invention.

Reference is also made to FIG. 7, which is a schematic illustration of an exemplary system for filtering out false positive classification of anomaly events detected in a certain site, according to some embodiments of the present invention.

An exemplary process 600 may be executed by an exemplary anomaly detection system 700 to detect and classify one or more predefined anomaly events in a certain site 204.

In particular, the anomaly detection system 700 may be configured to use one or more general non-site-specific classifiers such as the classifier 220 adapted and trained to classify, predict, and/or estimate the predefined anomaly event(s) based on imagery data, for example, frames, imaging maps, and/or the like captured in the site 204 by one or more image sensors 702 such as the image sensor 202 deployed to monitor the site 024 and/or part thereof.

The anomaly detection system 700 may further utilize one or more trained site-specific filter classifier which is specifically adapted and customized for the certain site 204 and thus adapted and trained to filter out one or more false positive classifications (detections) of the non-site-specific classifier 220.

The anomaly detection system 700, for example, a server, a processing node, a cluster of processing nodes, and/or the like may comprise an I/O interface 710 such as the I/O interface 210, a processor(s) 712 such as the processor(s) 212, and a storage such as the storage 214 for storing data and/or code (program store).

Via the I/O interface 710, the anomaly detection system 700 may communicate with the image sensor(s) 702 deployed to monitor at least part of the site 204 to receive imagery data, for example, one or more images, one or more video stream (sequence), one or more image maps, and/or the like depicting the site 204 and/or part thereof.

The processor(s) 712 may execute one or more software modules such as, for example, a process, a script, an application, an agent, a utility, a tool, an Operating System (OS), and/or the like each comprising a plurality of program instructions stored in a non-transitory medium (program store) such as the storage 714 and executed by one or more processors such as the processor(s) 712. The processor(s) 212 may optionally further, integrate, utilize and/or facilitate one or more hardware elements (modules) integrated and/or utilized in the anomaly detection system 700, for example, a circuit, a component, an IC, an ASIC, an FPGA, a DSP, a GPU, an AI accelerator and/or the like.

The processor(s) 712 may therefore execute one or more functional modules implemented using one or more software modules, one or more of the hardware modules and/or combination thereof.

For example, the processor(s) 712 may execute an anomaly detector 720 for executing the process 100 to detect one or more of the predefined anomaly events in the site 204 based on imagery data captured the image sensor(s) 702 deployed to monitor the site 204 and/or part thereof. The processor(s) 712 may further execute one or more general and non-site-specific classifiers 220 and one or more site-specific filter classifiers 222.

Optionally, the anomaly detection system 700 may be utilized by one or more cloud computing services, platforms and/or infrastructures such as, for example, IaaS, PaaS, SaaS and/or the like provided by one or more vendors, for example, Google Cloud, Microsoft Azure, AWS, EC2, IBM Cloud, and/or the like. In such case the cloud based anomaly detection system 700 may communicate with the image sensor(s) 702 via one or more networks to receive the imagery data captured by the image sensor(s) 702 to depict the site 204.

Optionally, the anomaly detection system 700 may utilize the training system 200 and execute the training engine 200 for executing the process 100 to train the one or more site-specific filter classifiers 222. In such embodiments, during an initial phase after deployment of the anomaly detection system 700 to monitor the site 204 in order to detect one or more of the predefined anomaly events, the anomaly detection system 700 may execute the process 100 to train the site-specific filter classifier(s) 222 to adapt to the site 204. After the initial training phase, the anomaly detection system 700 may use the site-specific filter classifiers 222 to filter out false positive detections of the predefined anomaly event(s) by the -site-specific classifier(s) 220.

As shown at 702, the anomaly detector 720 may receive imagery data comprising one or more image samples captured on-site in the site 204 by one or more of the image sensor(s) 702.

The on-site image samples may include, for example, one or more images, one or more frames, one or more imaging maps, and/or the like which depict at least part of the site 204.

As shown at 604, the anomaly detector 720 may apply the trained non-site-specific classifier(s) 220 to classify one or more of the on-site image samples depicting the site 204 and/or part thereof.

As described herein before, the general classifier(s) 220 may apply feature extraction, specifically image feature extraction, to extract a plurality of features from each on-site image sample and may create a corresponding on-site feature vector for each on-site sample.

The general classifier(s) 220 may then classify the on-site feature vector as positive, i.e., the on-site sample is estimated to depict one of the predefined anomaly event(s), or negative meaning that the on-site sample is estimated not to depict a predefined anomaly event. For example, as described herein before, the non-site-specific classifier(s) 220 may compute a classification score for the on-site feature vector extracted from each on-site sample.

As shown at 606, which is a conditional step, the anomaly detector 720 may determine whether the on-site sample is estimated by the non-site-specific classifier(s) 220 to be a positive sample meaning it is estimated to depict one or more of the predefined anomaly events or a negative sample which does not depict any of the predefined anomaly events.

For example, the classifications score computed for each on-site feature vector may be compare, for example, by the anomaly detector 720, to a classification threshold defined, computed, and/or predefined for the classifier(s) 220.

In case the classification score of a respective on-site feature vector exceeds the classification threshold, the corresponding on-site sample may be determined to be a positive sample. In such case, the process 600 may branch to 610 for further analysis of the respective on-site sample. However, in case the classification score of the respective on-site feature vector does not exceed the classification threshold, the corresponding on-site sample may be determined to be a negative sample and the process may branch to 608.

As shown at 608, since the respective on-site sample is estimated to be negative which does not depict any of the predefined anomaly events, the on-site sample is determined negative. Typically, no further action may be taken. However, optionally, the anomaly detector 720 may output, transmit, and/or otherwise provide a no detection indication.

As shown at 610, the anomaly detector 720 may apply one or more site-specific filter classifiers 222 to the feature vector corresponding to each on-site sample estimated by the non-site-specific classifier(s) 220 to be a positive sample in order to further estimate whether the respective on-site sample is positive or negative and filter out potential false positive classification made by the general classifier(s) 220.

As described herein before, the site-specific filter classifier(s) 222 may estimate, predict and/or classify the on-site feature vector as positive indicating the corresponding on-site sample is estimated to be a positive sample, or negative meaning the corresponding on-site sample is estimated to be a negative sample. For example, as described herein before, the site-specific filter classifier(s) 222 may compute a filter classification score for the on-site feature vector indicative of probability of correct classification of the respective on-site feature vector as positive or negative.

As shown at 612, which is another conditional step, the anomaly detector 720 may estimate and/or determine whether the respective on-site sample is estimated by the site-specific filter classifier(s) 222 to be a positive sample or a negative sample.

For example, the classifications score computed by the site-specific filter classifier(s) 222 for the on-site feature vector corresponding to the respective on-site sample may be compare, for example, by the anomaly detector 720, to a filter threshold defined, computed, and/or predefined for the site-specific filter classifier(s) 222.

In case the filter classification score of a respective on-site feature vector exceeds the filter threshold, the corresponding on-site sample may be estimated to be a true positive sample meaning that it is estimated that the non-site-specific classifier(s) 220 correctly classified the respective on-site sample as positive and the process 600 may branch to 616.

In case the filter classification score of the respective on-site feature vector does not exceed the filter threshold, the corresponding on-site sample may be estimated to be a false positive i.e., the respective on-site sample was wrongly classified as positive by the non-site-specific classifier(s) 220 while in fact it is estimated to be negative and the process 600 may branch to 614.

As shown at 614, since the respective on-site sample is estimated to be negative, the anomaly detector 720 may filter out the respective on-site sample and discard it as a no detection of any of the predefined anomaly event(s). Optionally, the anomaly detector 720 may output, transmit, and/or otherwise provide a no detection indication for the respective on-site sample.

As shown at 616, since the since the respective on-site sample is estimated to be positive and depict one or more of the predefined anomaly event(s), the anomaly detector 720 may output a detection indication to indicate, report, and/or alert that the predefined anomaly event(s) is detected in the site 204, specifically in the respective on-site image sample depicting the site 204 and/or part thereof.

For example, via the I/O interface 710, the anomaly detector 720 may transmit one or more alert messages over one or more networks to one or more systems, for example, an emergency service dispatch center, a security system, an event monitoring, control, and/or management system, and/or the like to report the detected anomaly event(s). In another example, the anomaly detector 720 may generate one or more visual, audible, and/or tactile alerts, warning, or indications to one or more users, for example, a supervisor, an emergency service personnel, a security person, and/or the like to inform of the detected anomaly event(s).

Figure 8:
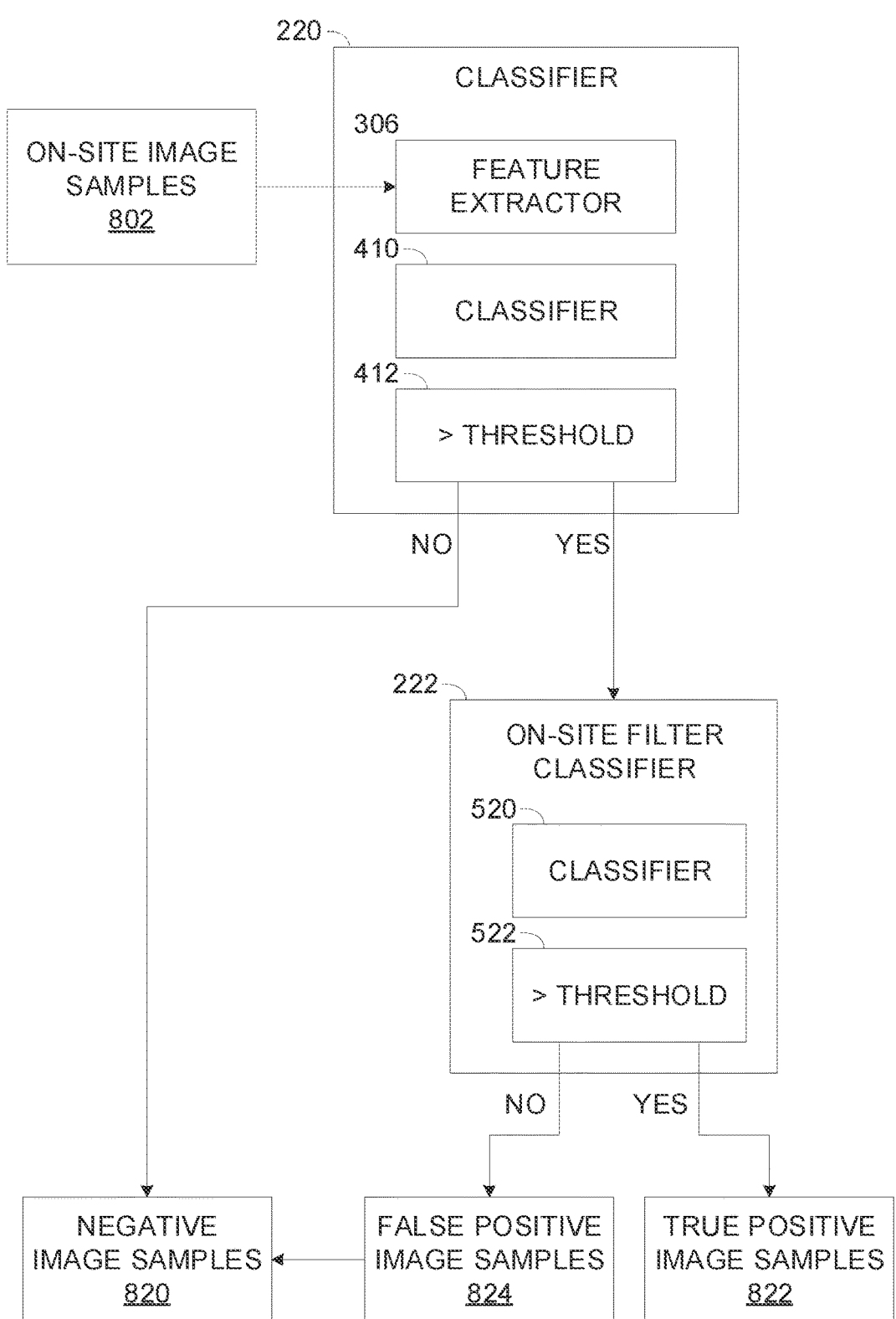
FIG. 8 is a schematic illustration of an exemplary sequence of filtering out false positive classification of anomaly events detected in a certain site, according to some embodiments of the present invention.

Reference is now made to FIG. 8, which is a schematic illustration of an exemplary sequence of filtering out false positive classification of anomaly events detected in a certain site, according to some embodiments of the present invention.

An exemplary sequence 800 following the process 600, may be executed, for example, by an anomaly detector such as the anomaly detector 720 executed by an anomaly detection system such as the anomaly detection system 700 to detect one or more predefined anomaly events in a certain site such as the site 204.

As seen, the anomaly detector 720 may inject into a classifier such as the general non-site-specific classifier 220 one or more on-site image samples 802 captured by one or more image sensors such as the image sensor 702 deployed to capture imagery data depicting the site 204 and/or part thereof.

The non-site-specific classifier 220 may apply one or more feature extractors such as the feature extractor 306 to extract features, specifically image (visual) features from each received on-site image sample and create for each on-site sample a corresponding on-site feature vector comprising the features extracted from the respective on-site sample.

The non-site-specific classifier 220 may use a one or more classifiers such as the classifier 410 to classify the on-site feature vector extracted from one or more of the received on-site image samples and compute a classification score which may be compared to a classification threshold such as the classification threshold 412 to estimate, predict, and/or determine whether the respective on-site sample is positive or negative.

In case the classification score computed for the on-site feature vector extracted from the respective on-site sample exceeds the classification threshold 412, the respective on-site sample is estimated by the non-site-specific classifier 220 to be positive. Otherwise, since the classification score computed for the on-site feature vector extracted from the respective on-site sample does not exceed the classification threshold 522, the anomaly detector 720 may determine that the respective on-site sample is a negative image sample 820.

In case a respective on-site sample is estimated positive by the general classifier 220, the anomaly detector 720 may inject the on-site feature vector extracted from the respective on-site sample into one or more site-specific filter classifiers such as the site-specific filter classifier 222.

The site-specific filter classifier 222 may use a one or more classifiers such as the classifier 520 and/or 410 to classify the on-site feature vector extracted from each on-site image sample classified as positive by the classifier 220 and may compute a filter classification score for the respective on-site feature vector which may be compared to a classification threshold such as the classification threshold 522 to estimate, predict, and/or determine whether the respective on-site feature vector is a false positive incorrectly classified as positive by the non-site-specific classifier 220 or whether the respective on-site feature vector is a true positive correctly classified as positive by the non-site-specific classifier 220.

In case the filter classification score computed for the on-site feature vector extracted from a respective on-site sample exceeds the filter threshold 522, the anomaly detector 720 may estimate, predict and/or determine that the respective on-site sample is a true positive 822. Otherwise, since the filter classification score computed for the on-site feature vector extracted from the respective on-site sample does not exceed the filter threshold 522, the anomaly detector 720 may estimate, predict, and/or determine that the respective on-site sample is false positive 824 and thus considered a negative image sample 820.

Optionally, the training engine 230 may train one or more of the site-specific filter classifier(s) 222 in an iterative process comprising a plurality of training iterations. In particular, in each training iteration, the training engine 230 may further train the site-specific classifier(s) 220 using a respective set of false positive feature vectors classified by the site-specific filter classifier(s) 222 as positive in a previous training iteration. In other words, positive classifications of feature vectors made by the site-specific filter classifier(s) 222 after a certain training iteration may be used as false positive feature vectors during one or more succeeding training iterations.

Specifically, these newly classified false positive feature vectors (of the current iteration) may be used by the training engine 230 together with previously used false positive feature vectors (initial or previous iteration(s)) to further train the site-specific filter classifier(s) 222 in one or more succeeding training iterations.

Optionally, one or more of the trained site-specific filter classifier(s) 222 used by the anomaly detection system 700 and optionally one or more of the non-site-specific classifier (s) 220 may be further trained online, post deployment, without affecting and/or interfering with classification and detection operation of the anomaly detection system 700 and it classifiers, i.e., the non-site-specific classifier(s) 220 and/or the site-specific filter classifier(s) 222.

In particular, the site-specific filter classifier(s) 222 may be further trained, for example, by a training engine such as the training engine 230, using one or more new on-site image samples captured after the non-site-specific classifier(s) 220 and/or the site-specific filter classifier(s) 222 are deployed to detect the predefined anomaly event(s) in the site 204.

Moreover, the site-specific filter classifier(s) 222 and optionally the non-site-specific classifier(s) 220 may be further trained in a plurality of training iterations.

Figure 9:
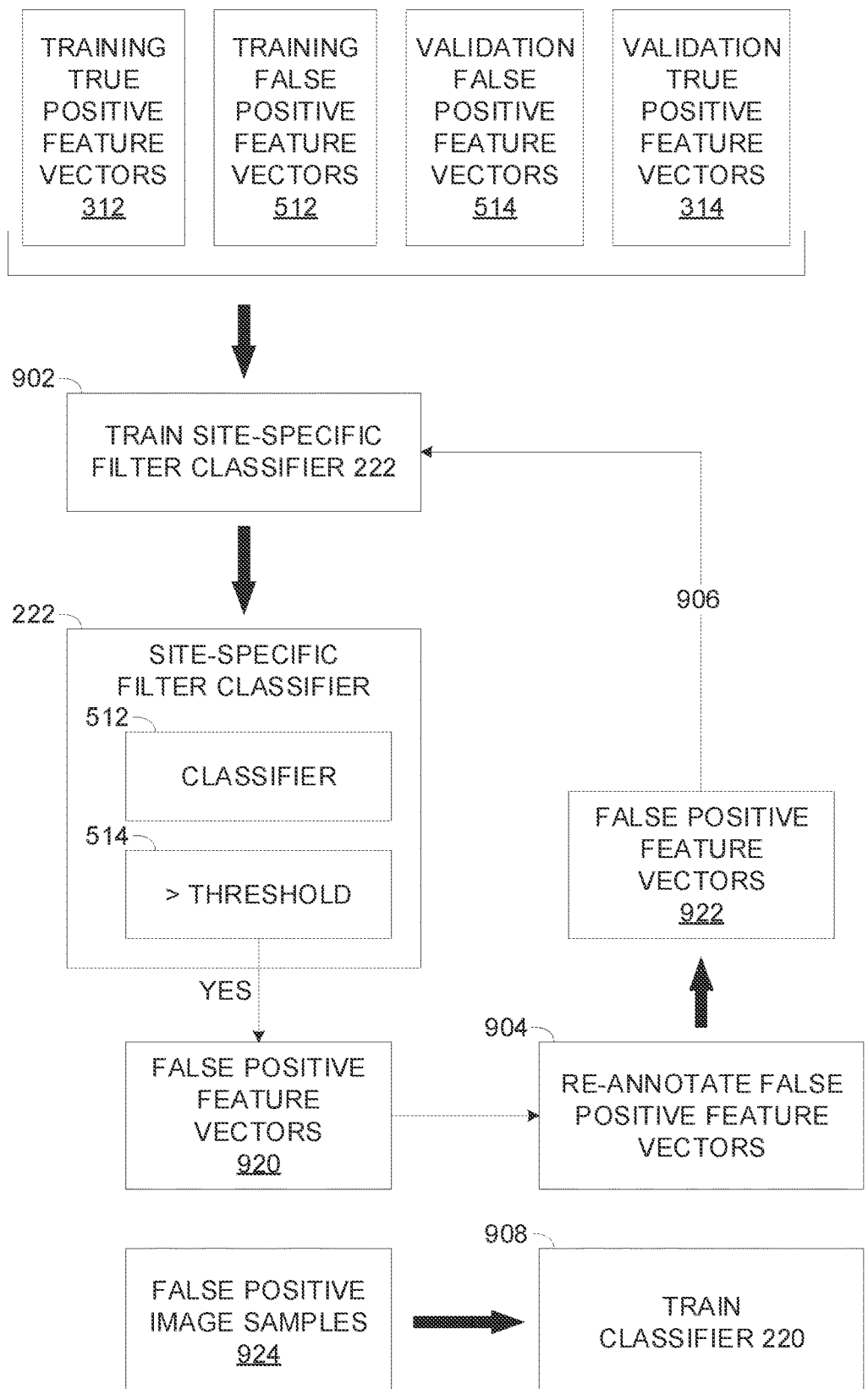
FIG. 9 is a schematic illustration of an exemplary multi-iteration sequence of training site-specific filter classifiers to filter out false positive classification of anomaly events detected in a certain site, according to some embodiments of the present invention.

Reference is now made to FIG. 9, which is a schematic illustration of an exemplary multi-iteration sequence of training site-specific filter classifiers to filter out false positive classification of anomaly events detected in a certain site, according to some embodiments of the present invention.

An exemplary sequence 900 may be executed, for example, by a training engine such as the training engine 230 executed by an anomaly detection system such as the anomaly detection system 700, post deployment of one or more site-specific filter classifier such as the site-specific filter classifier 222 to further train the site-specific filter classifier(s) 222 in a multi-iteration process to filter out false positive classifications of one or more predefined anomaly events detected in a certain site such as the site 204 by a non-site-specific classifier such as the classifier 220.

Optionally, the non-site-specific classifier 220 may be also further trained in the multi-iteration training process.

As seen at 902, during the initial training session, the training engine 230 may execute the process 100 to train and optionally validate the site-specific filter classifier(s) 222 using the training true positive feature vectors 312, the training false positive feature vectors 512, the validation true positive feature vectors 314 and the validation false positive feature vectors 512.

After trained and switched to operational mode to filter out false positive classifications made by the non-site-specific classifier 220, the site-specific filter classifier(s) 222 may classify, estimate, and/or predict as false positive one or more on-site feature vectors 920 extracted from corresponding on-site image samples which were classified as true positive by the non-site-specific classifier 220.

However, during a certain limited time, for example, a week, two weeks, and/or the like it is assumed that no predefined anomaly event(s) take place (occur) at the certain site 204. Therefore true positive classifications of on-site feature vectors 920 made by the site-specific filter classifier(s) 222 during this time, i.e., on-site feature vectors 920 having a probability score exceeding the threshold 522, are assumed to be actually false positive 920.

As seen in 904, the training engine 230 may annotate each such on-site feature vector 920, which is assumed to be false positive and incorrectly classified as true positive by the site-specific filter classifier(s) 222, by associating it with a label indicative that the respective feature vectors 620 is false positive to produce another dataset of false positive feature vectors 922.

As seen in 906, the training engine 230 may initiate another training iteration to further train the site-specific filter classifier(s) 222 using one or more of the false positive feature vectors 922, typically together with the datasets 312, 512, 314, and/or 514. This process may be repeated in one or more additional iterations using additional false positive feature vectors 922 extracted from additional on-site image samples incorrectly classified by the non-site-specific classifier 220 as positive while they are estimated to be negative.

Moreover, the training engine 230 may further train the non-site-specific classifier 220 in one or more additional training iterations using negative on-site image samples which were previously classified incorrectly as positive by the non-site-specific classifier 220.

To this end, the training engine 230 may collect, save and store on-site image samples corresponding to one or more of the false positive feature vectors 922 may be collected in a false positive image sample dataset 924, for example, in a storage such as the storage 714. The training engine 230 may further annotate each such false positive image sample 924 as a negative image sample.

As seen in 908, the training engine 230 may initiate another training iteration to further train the non-site-specific classifier 220 using one or more of the false positive image sample 924 previously classified by the classifier 220 as positive but estimated and/or determined to be negative and is labeled accordingly as negative.

Optionally, one or more uncertain on-site image samples may be identified for which it is difficult or impossible to inconclusively determine whether they depict one or more of the predefined anomaly events or not, may be reviewed to increase certainty of defining these samples as positive or negative. This may be done either during the training phase of the site-specific filter classifier(s) 222 and or during post deployment further training of one or more of the site-specific filter classifier(s) 222.

For example, assuming the site-specific filter classifier(s) 222 computes a marginal filter classification score for one or more on-site feature vectors extracted from one or more corresponding on-site image samples. In case the marginal filter classification score is just slightly below the filter threshold 512 for example, the anomaly detector 720 may determine that the corresponding on-site image sample(s) is negative, i.e. it does not depict any of the predefined anomaly event(s). In another example, assuming the marginal filter classification score is slightly above the filter threshold 512, the anomaly detector 720 may determine that the corresponding on-site image sample(s) is positive, i.e. it depicts one or more of the predefined anomaly event(s).

Such scenarios are obviously subject to mistakes and wrong classifications by the site-specific filter classifier(s) 222 and/or by the non-site-specific classifier(s) 220. For example, the site-specific filter classifier(s) 222 may incorrectly classify a positive on-site sample as negative (false negative) and/or vice versa incorrectly classify a negative on-site sample as positive (false positive).

In order to increase certainty of whether such marginal on-site image samples are indeed positive or negative, these on-site samples may be reviewed, automatically and/or manually.

Moreover, the reviewed on-site samples and/or their corresponding feature vectors may be annotated accordingly to indicate whether each such reviewed on-site sample is positive or negative. The annotated on-site samples and/or their corresponding feature vectors may be used to further train one or more of the site-specific filter classifier(s) 222 and/or one or more of the non-site-specific classifier(s) 220. In particular, the annotated on-site samples may be used to further train the non-site-specific classifier(s) 220 and the annotated feature vectors may be used to further train the site-specific filter classifier(s) 222.

Reference is now made to FIG. 10, which is a flowchart of an exemplary process of analyzing and annotating uncertain false positive samples which are potentially positive samples, according to some embodiments of the present invention.

An exemplary process 1000 may be executed, for example, by a training engine such as the training engine 230, to identify uncertain on-site image samples classified as positive by a site-specific filter classifier(s) such as the site-specific filter classifier(s) 222 and analyze them to determine whether they are indeed positive or negative.

In particular, such uncertain on-site image samples may be manually analyzed by one or more operators, for example, an analyst, a supervisor, a technician, a programmer, a controller, and/or the like to determine whether they are positive or negative, i.e., whether they depict one or more of the anomaly event(s) or not.

Optionally, in order to preserve privacy, security and/or safety of people and/or objects which may be seen in the uncertain image samples, the uncertain image samples may be processed to remove privacy features before they undergo manual analysis.

As seen in 1002, the training engine 230 may identify one or more uncertain on-site samples. These on-site samples are classified by the site-specific filter classifier 222 as positive but are estimated to have an uncertain true label.

Moreover, optionally, the operator(s) may manually select one or more suspicious time intervals during which or more uncertain on-site samples were identified and omit them from the training dataset used for training the site-specific filter classifier(s) 222.

As shown at 1004, which is an optional step, in order to preserve privacy, security and/or safety of people and/or objects which may be seen in the uncertain image samples during the manual analysis, optionally one or more of the uncertain image samples may be processed to remove privacy features from them, for example, faces, car plates, identify attributes, street names, house numbers, and/or the like. For example, the training engine 230 may apply one or more of the image analysis methods, techniques, algorithms and/or tools to one or more of the uncertain image samples to identify such privacy features in the samples and remove them.

As shown at 1006, one or more of the uncertain on-site samples may be analyzed manually by one or more operators, for example, an analyst, a supervisor, a technician, a programmer, a controller, and/or the like who may determine whether the respective on-site image sample is positive or negative.

As seen in 1008, each of the uncertain on-site image sample, specifically the feature vector extracted from each uncertain on-site image sample, may be annotated according to the analysis and associated with a label indicative of whether the respective on-site sample is positive or negative. Annotation of the uncertain on-site samples may be done automatically by the training engine 230 and according to input received from the analysts.

As seen in 1010, the training engine 230 may further train one or more of the site-specific filter classifier(s) 222 using the annotated feature vectors extracted from one or more of the uncertain on-site image samples.

Optionally, the training engine 230 may use the annotated uncertain on-site image samples to further train one or more non-site-specific classifiers such as the non-site-specific classifier 220 used by the anomaly detection system 700.

According to some embodiments of the present invention, an updated non-site-specific classifier 220' may be deployed online in the anomaly detection system 700, i.e., post deployment of a previous version classifier 220 and after the site-specific filter classifier(s) 222 is trained and customize for the specific site 204. In such case, one or more of the site-specific filter classifier(s) 222 used by the anomaly detection system 700 may need to be updated and adjusted to filter out false positive classifications made by the updated non-site-specific classifier 220'.

To this end, a process such as the process 100 may be initiated after the updated non-site-specific classifier 220' is deployed in order to collect negative samples, specifically on-site feature vectors classified as false positive by the updated classifier 220' and re-train the site-specific filter classifier(s) 222.

However, this process may be time consuming since in order to effectively re-train the site-specific filter classifier(s) 222, a sufficiently large number of false positive samples may need to be collected over a significant time period, for example, several days, during which the anomaly detection system 700 may be offline and/or not operational.

In order to overcome this limitation, rather than executing the process 100 and apply the updated classifier 220' to classify newly captured on-site samples, a plurality of previously classified image samples may be driven to the updated classifier 220' which may generate corresponding false positive on-site feature vectors which in turn may be used for training the site-specific filter classifier(s) 222 thus adapting it for filtering out false positive classifications of the updated classifier 220'.

This means that rather than collecting a new set of negative samples, i.e., on-site samples including false positive samples, after deploying the updated non-site specific classifier 220', as described in the process 100, the updated classifier 220' may be applied to previously captured negative samples. On-site feature vectors generated from these samples and classified as false positive may be then used for re-training the site-specific filter classifier(s) 222.

Reference is now made to FIG. 11, which a schematic illustration of an exemplary sequence of re-training a site-specific filter classifier to filter out false positive classification of an updated classifier deployed to replace a previous classifier for classifying anomaly events detected in a certain site, according to some embodiments of the present invention.

An exemplary sequence 1100 may be executed, for example, by a training engine such as the training engine 230 executed by an anomaly detection system such as the anomaly detection system 700, post deployment of one or more site-specific filter classifier such as the site-specific filter classifier 222 to train the site-specific filter classifier 222 to adapt to an updated non-site-specific classifier 220' deployed to replace a previous version non-site-specific classifier such as the classifier 220.

As seen in 1102, an updated non-site-specific classifier 220' may be deployed in the anomaly detection system 700, for example, a new version classifier, an enhanced classifier, and/or the like to replace the previous version non-site-specific classifier 220.

As seen in 1104, the training engine 230 may drive into the updated classifier 220' a plurality of on-site image samples, specifically stored on-site image samples which were captured previously, i.e., in the past, by one or more image sensors such as the image sensors 702 monitoring a certain site such as the site 204.

In particular, the training engine 230 may apply the updated classifier 220' to classify one or more on-site image samples which were previously classified as false positive samples by the trained site-specific filter classifier(s) 222 deployed in the anomaly detection system 700. For example, the training engine 230 may fetch one or more false positive on-site image samples such as the false positive image samples 424 classified and stored during the training phase of the site-specific filter classifier(s) 222. In another example, the training engine 230 may fetch one or more false positive on-site image samples such as the false positive image samples 824 classified and stored online after the site-specific filter classifier(s) 222 completed its initial training and was switched to operational mode. In another example, the training engine 230 may fetch one or more false positive on-site image samples such as the false positive image samples 924 associated with on-site feature vectors 920 which assumed to be false positive during the iterative training process of the site-specific filter classifier(s) 222.

The updated classifier 220' may generate on-site feature vectors by extracting features from the on-site samples and classify them as described herein before. The training engine 230 may collect a plurality of feature vectors 1122 classified by the updated classifier 220' as positive which are in fact false positive since they are generated from false positive image samples, for example, the false positive image samples 424, 824, and/or 924.

As shown at 1106, the training engine 230 may use the false positive feature vectors 1122 for re-training one or more of the site-specific filter classifier(s) 222 thus producing updated site-specific filter classifier(s) 222' adapted for filtering out false positive classifications of the updated classifier 220'.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML models, neural networks, an feature extraction, classification, and image analysis are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of training site-specific filter classifiers, comprising:

using at least one processor for:

receiving a plurality of on-site feature vectors created by at least one classifier deployed in a certain site to classify at least one predefined anomaly event based on imagery data captured in the certain site, the at least one classifier is trained using a plurality of non-site-specific samples;

selecting a plurality of false positive feature vectors from a subset of the plurality of on-site feature vectors having a score exceeding a certain threshold;

receiving a plurality of true positive feature vectors extracted from positive samples reflecting the at least one predefined anomaly event;

training at least one site-specific filter classifier using the plurality of false positive feature vectors and the plurality of true positive feature vectors; and providing the at least one site-specific filter classifier for filtering out at least one false positive detection of the at least one anomaly event detected in the certain site by the at least one classifier.

2. The method of claim 1, wherein:

each of the plurality of on-site feature vectors comprises a plurality of features extracted from a corresponding one of a plurality of on-site image samples captured by at least one image sensor deployed to monitor at least part of the certain site, and each of the plurality of true positive feature vectors comprises a plurality of features extracted from a respective one of the plurality of non-site-specific samples.

3. The method of claim 1, wherein the at least one site-specific filter classifier is integrated in the at least one classifier.

4. The method of claim 1, wherein the at least one site-specific filter classifier is independent of the at least one classifier.

5. The method of claim 1, wherein the at least one site-specific filter classifier comprises a plurality of site-specific filter classifiers each trained to filter out false positive detection of the at least one predefined anomaly event under different environmental conditions.

6. The method of claim 1, wherein a number of the plurality of false positive feature vectors exceeds a predefined number.

7. The method of claim 1, wherein the plurality of false positive feature vectors are extracted from a plurality of on-site samples captured during a time period exceeding a predefined time period.

8. The method of claim 1, wherein the training comprises:

using a training subset to train the at least one site-specific filter classifier, the training subset comprises a first group of false positive feature vectors selected from the plurality of false positive feature vectors and a first group of true positive feature vectors selected from the plurality of true positive feature vectors, and using a validation subset to set a filter threshold for the at least one site-specific filter classifier such that each false positive feature vector having a filter classification score, computed by the at least one site-specific filter classifier, which does not exceed the filter threshold is filtered out, the validation subset comprises a second group of false positive feature vectors selected from the plurality of false positive feature vectors and a second group of true positive feature vectors selected from the plurality of true positive feature vectors.

9. The method of claim 1, wherein the training of the at least one site-specific filter classifier employs supervised learning wherein the false positive feature vectors having an exceeding score are annotated automatically.

10. The method of claim 1, further comprising further training the at least one site-specific filter classifier online, post deployment, without interfering with detection operation of the at least one classifier.

11. The method of claim 1, further comprising training the at least one site-specific filter classifier in at least one additional training iteration, wherein in each iteration the at least one site-specific filter classifier is further trained using a respective set of false positive feature vectors classified by the at least one classifier as positive in a previous iteration.

12. The method of claim 1, further comprising:

identifying at least one uncertain on-site sample classified as false positive which is estimated to potentially be true positive, analyzing the at least one uncertain on-site sample to determine whether it is true positive or false positive, annotating the feature vector extracted from the at least one uncertain on-site sample as positive or negative according to the determination, and using the annotated feature vector for further training the at least one site-specific filter classifier.

13. The method of claim 12, further comprising applying at least one image processing algorithm to remove privacy features from the at least one uncertain on-site sample.

14. The method of claim 12, wherein the at least one on-site sample is manually analyzed and annotated as positive or negative.

15. The method of claim 1, further comprising deploying at least one updated classifier to replace the least one classifier, and training the at least one site-specific filter classifier using at least one on-site feature vector extracted from at least one stored on-site sample captured prior to the update and classified by the at least one updated classifier.

16. The method of claim 1, wherein the at least one site-specific filter classifier comprises at least one machine learning model.

17. A system for training an on-site filter classifier, comprising:

a memory storing a code; and at least one processor configured to execute the code, the code comprising:

code instructors to receive a plurality of on-site feature vectors created by at least one classifier deployed in a certain site to classify at least one predefined anomaly event based on imagery data captured in the certain site, the at least one classifier is trained using a plurality of non-site-specific samples;

code instructors to select a plurality of false positive feature vectors extracted from a subset of the plurality of on-site feature vectors having a score exceeding a certain threshold;

code instructors to receive a plurality of true positive feature vectors extracted from positive samples reflecting the at least one predefined anomaly event;

code instructors to train at least one site-specific filter classifier using the plurality of false positive feature vectors and the plurality of true positive feature vectors; and code instructors to provide the at least one site-specific filter classifier for filtering out at least one false positive detection of the at least one anomaly event detected in the certain site by the at least one classifier.

18. A method of reducing false positive classification events using site-specific filter classifiers, comprising:

using at least one processor for:

receiving at least one on-site sample classified as positive by at least one classifier deployed in a certain site to detect at least one predefined anomaly event based on imagery data depicting at least part of the certain site;

applying at least one site-specific filter classifier to compute a filter classification score for an on-site feature vector extracted from the at least one on-site sample;

estimating whether the at least one on-site sample is true positive or false positive based on comparison of the filter classification score to a filter threshold;

filtering out the at least one on-site sample in case the filter classification score does not exceed the filter threshold; and outputting at least one detection indication in case the filter classification score exceeds the filter threshold indicative of detection of the at least one predefined anomaly event;

wherein the at least one classifier is trained using a plurality of non-site-specific samples;

wherein the at least one site-specific filter classifier is trained using a plurality of false positive feature vectors and a plurality of true positive feature vectors, the plurality of false positive feature vectors are extracted from a subset of a plurality of on-site samples having a score, computed by the at least one classifier, exceeding a certain threshold, and the plurality of true positive feature vectors extracted from a subset of the plurality of non-site-specific samples reflecting the at least one predefined anomaly event.

* * * * *